US012245618B2

(12) United States Patent
Hunt et al.

(10) Patent No.: US 12,245,618 B2
(45) Date of Patent: Mar. 11, 2025

(54) BRINE WITHOUT PHOSPHATES AND EITHER SALT FREE OR LOW SALT

(71) Applicant: KEMIN PROTEINS, LLC, Des Moines, IA (US)

(72) Inventors: Dale R. Hunt, Sandusky, OH (US); William R. Fielding, Hilton Head, SC (US); Michael Cropp, Austin, MN (US)

(73) Assignee: KEMIN PROTEINS, LLC, Des Moines, IA (US)

( * ) Notice: Subject to any disclaimer, the term of this patent is extended or adjusted under 35 U.S.C. 154(b) by 0 days.

(21) Appl. No.: 18/065,148

(22) Filed: Dec. 13, 2022

(65) Prior Publication Data

US 2023/0180801 A1 Jun. 15, 2023

Related U.S. Application Data

(60) Provisional application No. 63/265,337, filed on Dec. 13, 2021.

(51) Int. Cl.

*A23L 13/40* (2023.01)
*A23L 27/40* (2016.01)
*A23L 29/281* (2016.01)

(52) U.S. Cl.

CPC ............ *A23L 13/428* (2016.08); *A23L 27/45* (2016.08); *A23L 29/281* (2016.08)

(58) Field of Classification Search

CPC ....... A23L 13/428; A23L 27/45; A23L 29/281
USPC .......................................................... 426/589
See application file for complete search history.

(56) References Cited

U.S. PATENT DOCUMENTS

| | | | | |
|---|---|---|---|---|
| 4,402,987 A * | 9/1983 | von Lersner | A23L 13/72 426/652 |
| 5,989,601 A * | 11/1999 | Bodenas | A23L 13/45 426/641 |
| 9,161,555 B2 | 10/2015 | Kelleher et al. | |
| 10,010,097 B2 | 7/2018 | Kelleher et al. | |
| 10,375,974 B2 | 8/2019 | Kelleher et al. | |

(Continued)

FOREIGN PATENT DOCUMENTS

JP 2014023493 A 2/2014

OTHER PUBLICATIONS

Invitation to Pay Additional Fees and Provisional Opinion on Patentability mailed Apr. 20, 2023, issued in corresponding International Application No. PCT/US2022/081466, filed Dec. 13, 2022, 13 pages.

(Continued)

*Primary Examiner* — Brent T O'Hern

(74) *Attorney, Agent, or Firm* — NYEMASTER GOODE P.C.

(57) ABSTRACT

A first brine free of salt and phosphate for treating a food product by injection of the brine into the food product. The brine is formed from an emulsion consisting of water, saltless flavoring and protein. The protein is from the same type of food product as the food product being injected with the brine. A second brine especially for ham with the bine being similar to the first brine, but with a low sodium content of a maximum of 0.5% to 1.0% of the weight of the food product. A third brine for pork bellies without phosphate.

11 Claims, 38 Drawing Sheets
(34 of 38 Drawing Sheet(s) Filed in Color)

(56) References Cited

U.S. PATENT DOCUMENTS

2023/0309589 A1* 10/2023 Hunt .................... A23L 13/428
426/644

OTHER PUBLICATIONS

International Search Report and Written Opinion mailed Jun. 13, 2023, issued in corresponding International Application No. PCT/US2022/081466, filed Dec. 13, 2022, 22 pages.
Lowder, A.C., et al., Evaluation of a Dehydrated Beef Protein to Replace Sodium-Based Phosphates in Injected Beef Strip Loins, Meat Science 89(4):491-199, Dec. 2011.

* cited by examiner

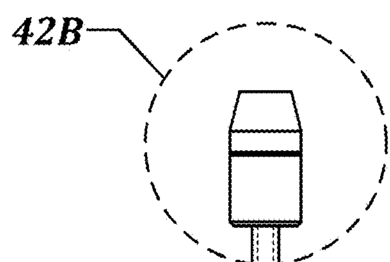
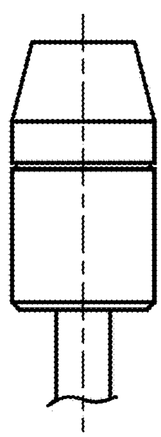
FIG. 42B
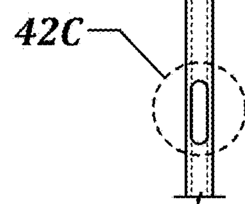
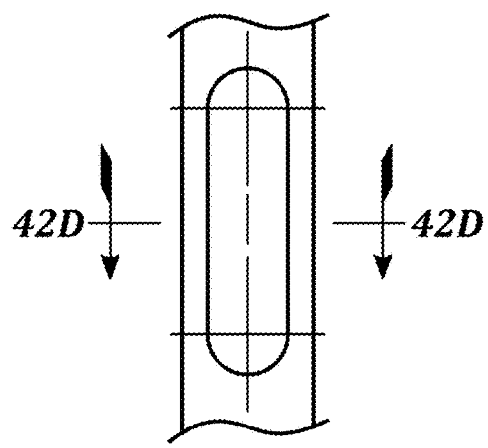
FIG. 42C
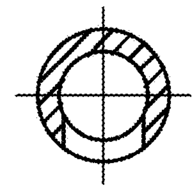
FIG. 42D
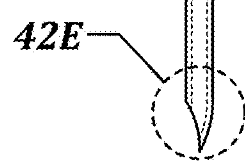
FIG. 42A
FIG. 42E

BRINE WITHOUT PHOSPHATES AND EITHER SALT FREE OR LOW SALT

CROSS-REFERENCE TO RELATED APPLICATION

This application claims the benefit of U.S. Provisional Application No. 63/265,337 filed Dec. 13, 2021, the entire contents of which are incorporated herein by reference.

BACKGROUND

Brines and marinades are commonly injected or otherwise introduced into food products, including beef, pork, poultry, fish, and plant proteins, to help retain the moisture level and enhance the flavor of the food product after completion of cooking or other food preparation. Such brines and marinades often require the presence of salt and phosphates in order for the brine/marinade to be retained within the food product. However, salt and phosphates are not conducive to a healthy diet, and can lead to high blood pressure and other coronary problems. Thus, consumers desire lower sodium food products, as well as food products that have fewer or no "artificial" ingredients. The present disclosure seeks to address this desire of consumers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a brine free of salt and phosphate is provided for treating a food product by injection of the brine into the food product. The brine includes: water; saltless flavoring; and protein from the corresponding type of food product being injected with brine.

In any of the embodiments described herein, wherein the saltless flavoring is selected from the group consisting of: broth, pickling spice, smoke flavor, and honey.

In any of the embodiments described herein, wherein the broth is composed in part of the same type of food product that is being brined.

In any of the embodiments described herein, wherein the food product is selected from the group consisting of meat, deli meat, fresh meat, poultry, fish, and plant material.

In any of the embodiments described herein, wherein the deli meat is selected from the group consisting of deli beef, chicken, turkey, or pork.

In any of the embodiments described herein, wherein the protein is a naturally occurring protein.

In any of the embodiments described herein, wherein the protein is a muscle protein is composed of myofibrillar protein and sarcoplasmic protein.

In any of the embodiments described herein, wherein the proportion of myofibrillar protein and sarcoplasmic protein in the brine corresponds to the proportion naturally occurring in the corresponding type of food product being brined.

In any of the embodiments described herein wherein the muscle protein comprises from 10 to 16 percent of the weight of the food product being marinated.

In any of the embodiments described herein, further including a cure selected from the group consisting of nitrate, nitrite and celery powder.

In any of the embodiments described herein, further including a cure accelerator selected from the group consisting of cherry powder, sodium erythorbate, and sodium ascorbate.

In any of the embodiments described herein, further comprising a binder is selected from the group consisting of: sodium phosphate, starch, carrageenan, xanthan gum, soy protein.

In any of the embodiments described herein, further comprising a sweetener is selected from the group consisting of brown sugar, white sugar, honey, dextrose.

In accordance with another embodiment of the present disclosure, a brine free of phosphates is disclosed for treating deli meat by injection of the brine into the deli meat. The brine includes water, flavoring, sodium limited to 0.5 to 1.0%, and muscle protein from the corresponding type of deli meat being injected with the brine.

In any of the embodiments described herein, wherein the deli meat is selected from the group consisting of deli beef, chicken, turkey, and ham.

In any of the embodiments described herein, wherein the muscle protein comprising from 10 to 16 percent of the weight of the deli meat.

In any of the embodiments described herein, wherein the muscle protein is a naturally occurring protein composed of myofibrillar protein and sarcoplasmic protein.

In any of the embodiments described herein, wherein the proportion of myofibrillar protein and sarcoplasmic protein in the brine corresponds to the proportion naturally occurring in the corresponding type of deli meat being brined.

In accordance with another embodiment of the present disclosure, a brine free of phosphates is disclosed for treating pork bellies by injection of the brine into the pork bellies. The brine includes water, flavoring, sodium, and muscle protein from the pork belly.

In any of the embodiments described herein, wherein the muscle protein is a naturally occurring protein comprising from 10 to 15 percent of the weight of the pork belly.

In accordance with another embodiment of the present disclosure, an array of injection needles for use with injection devices is disclosed for injecting a brine into meat food products, the devices having a needle carrier for supporting the needle during use and a brine feed chamber for supplying the brine to the needle. The needles include: a hollow needle body; a tip at the distal end of the needle body for delivering the brine into food products; at least one inlet port spaced from the tip and extending through the needle body and registrable with the feed chamber, the inlet port elongated in the direction of the length of the needle; wherein, in at least some of the injection needles of the array, an opening is formed in the distal end of the tip for delivering the brine into the food product; and wherein, in at least some of the injection needles of the array, one or more outlet opening are formed in the side wall of the tip at a location space from the distal end of the tip for delivering the brine into the food product.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein:

FIG. 1 is a photograph of pork knuckles that have been injected with brine, macerated and massaged.

FIG. 2 is a photograph of the pork knuckles of FIG. 1 that have been stuffed into ham logs;

FIG. 3 is a photograph of a ham log that has been cooked and sliced;

Figure 4:
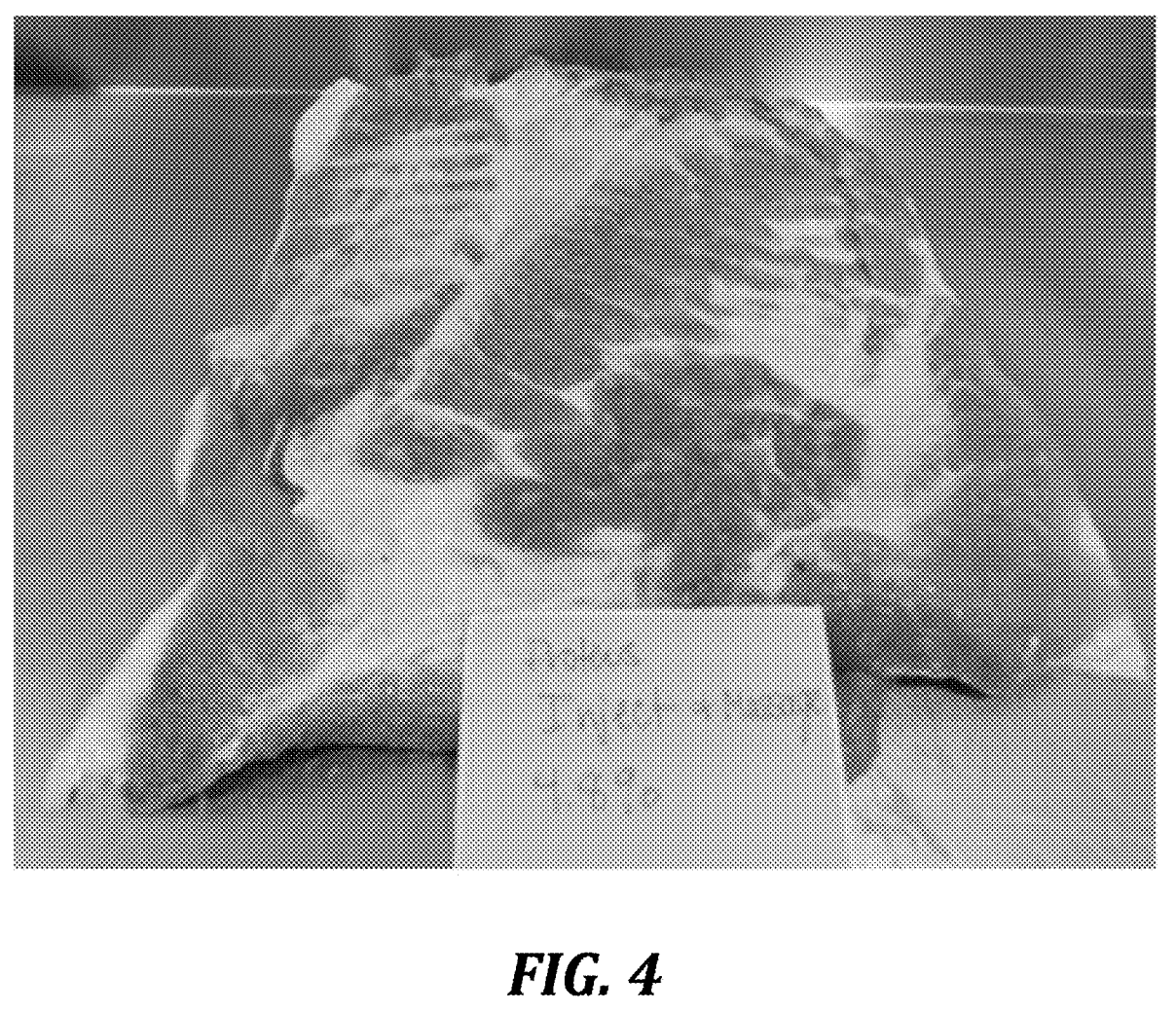

FIG. 4 is a photograph of a pork belly that has been injected with a natural protein brine;

Figure 6:
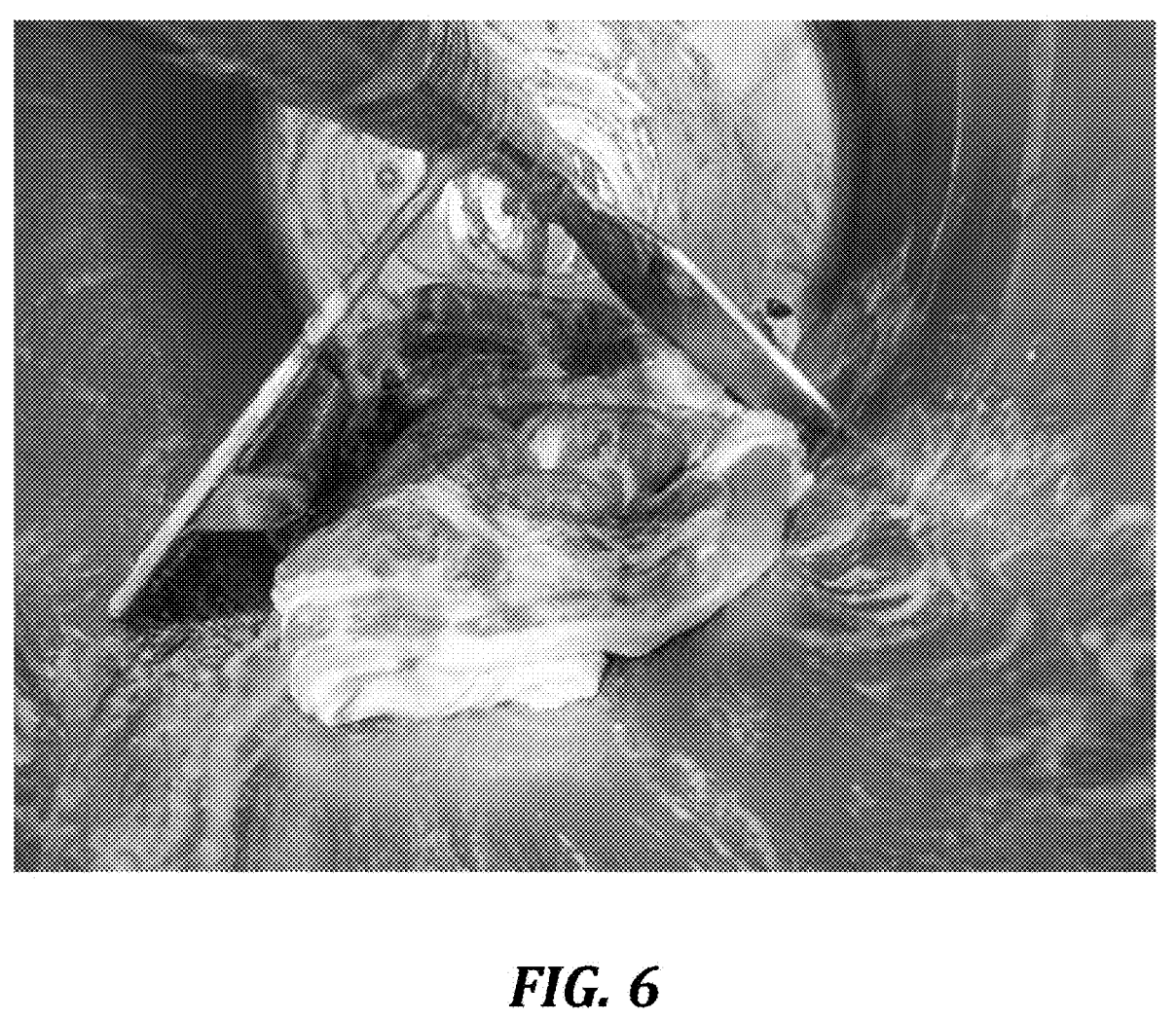

FIG. 6 is a photograph of a brined pork belly being massaged;

Figure 7:
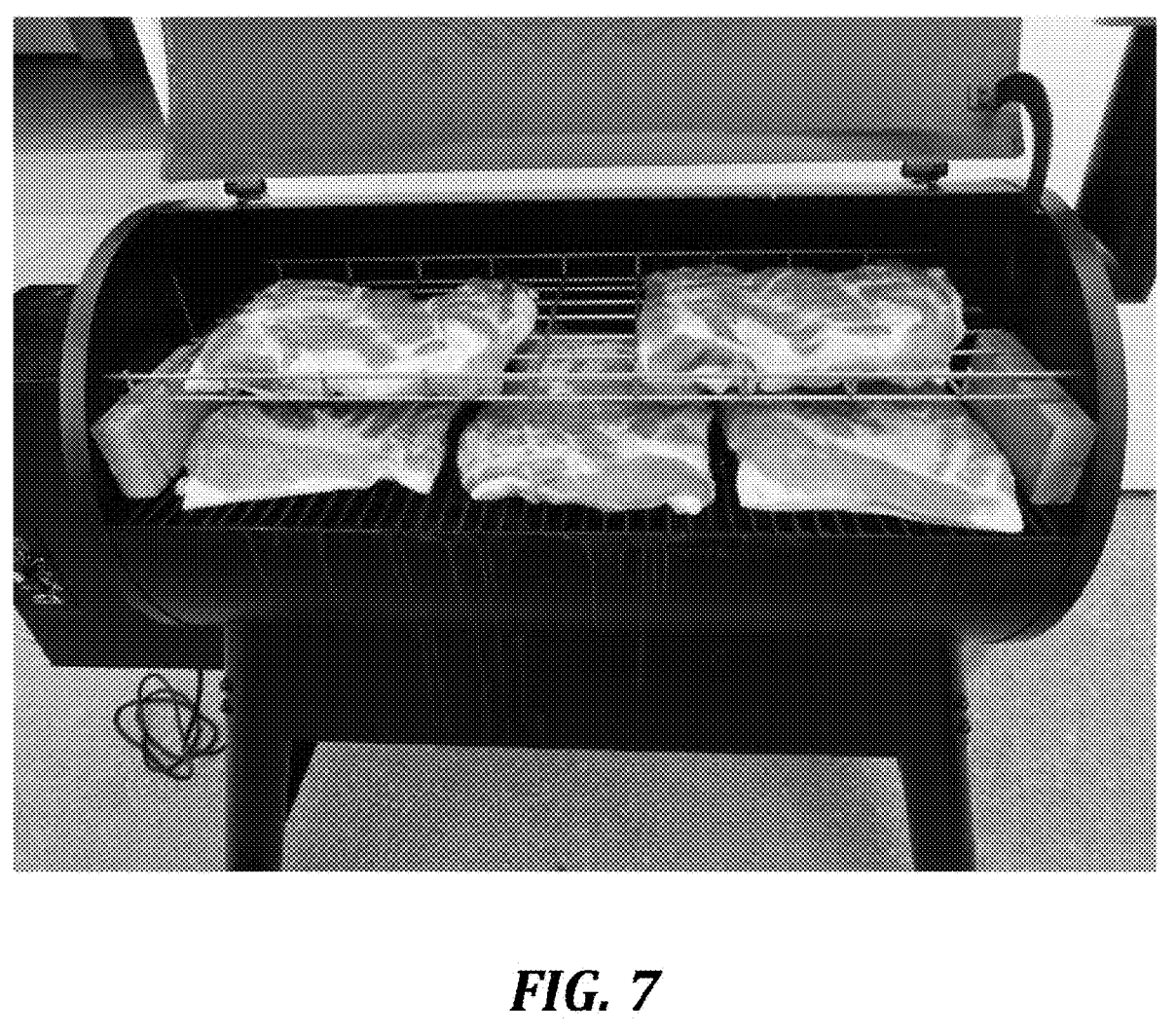

FIG. 7 shows brined pork bellies that have be cut and placed into a smoke;

Figure 8:
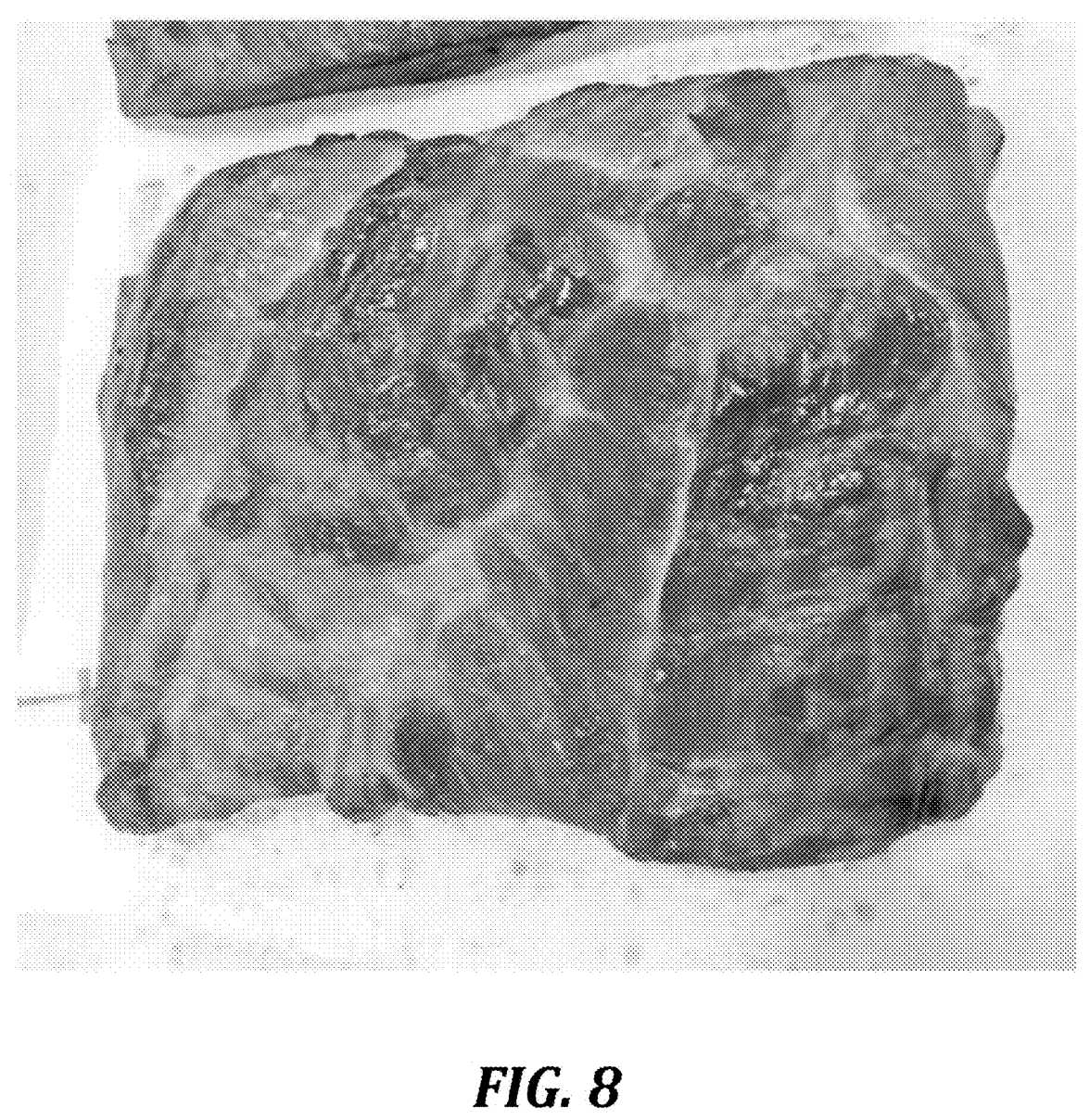

FIG. 8 is photograph of a pork belly after being smoked;

Figure 19:
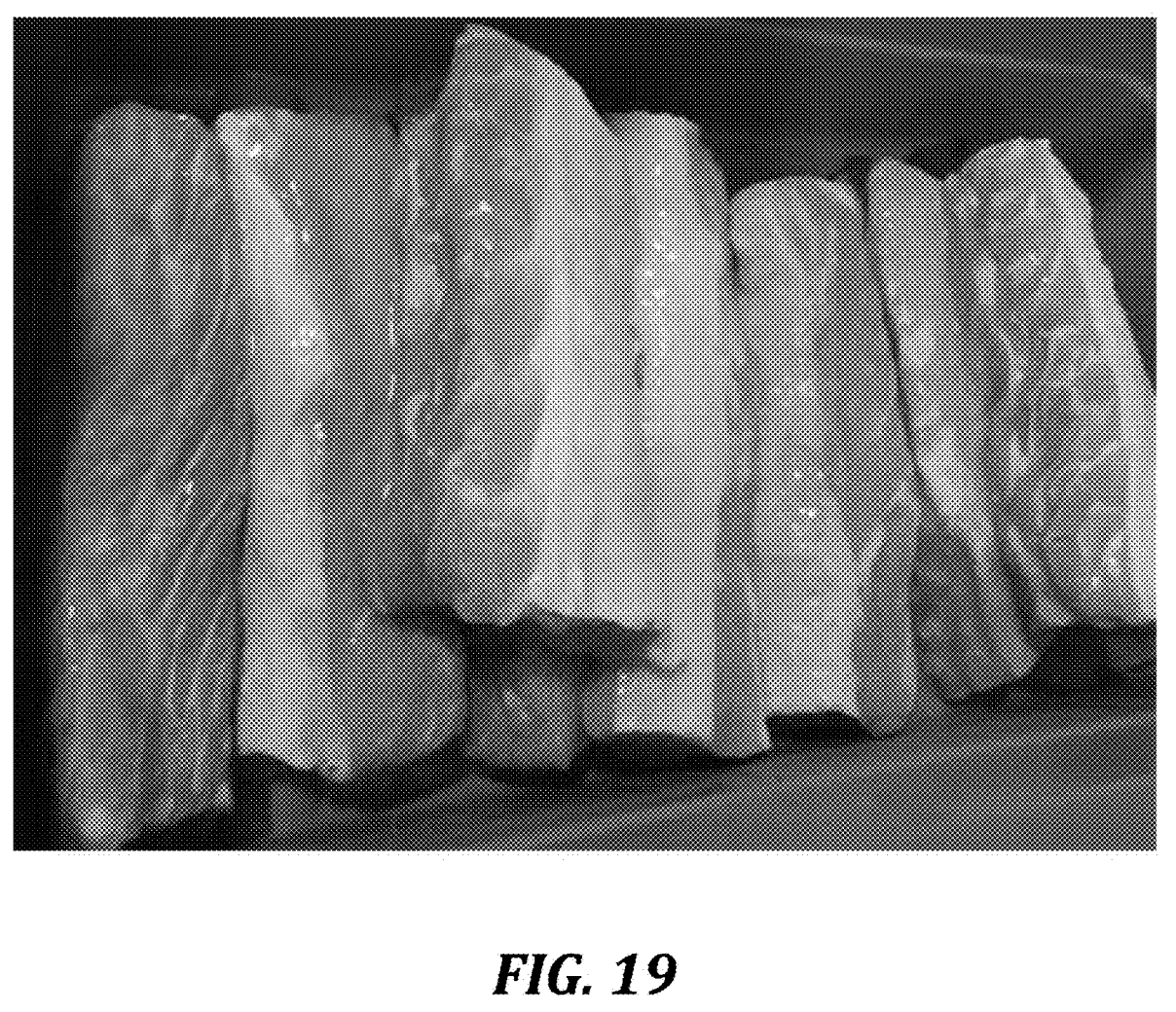
Figure 22:
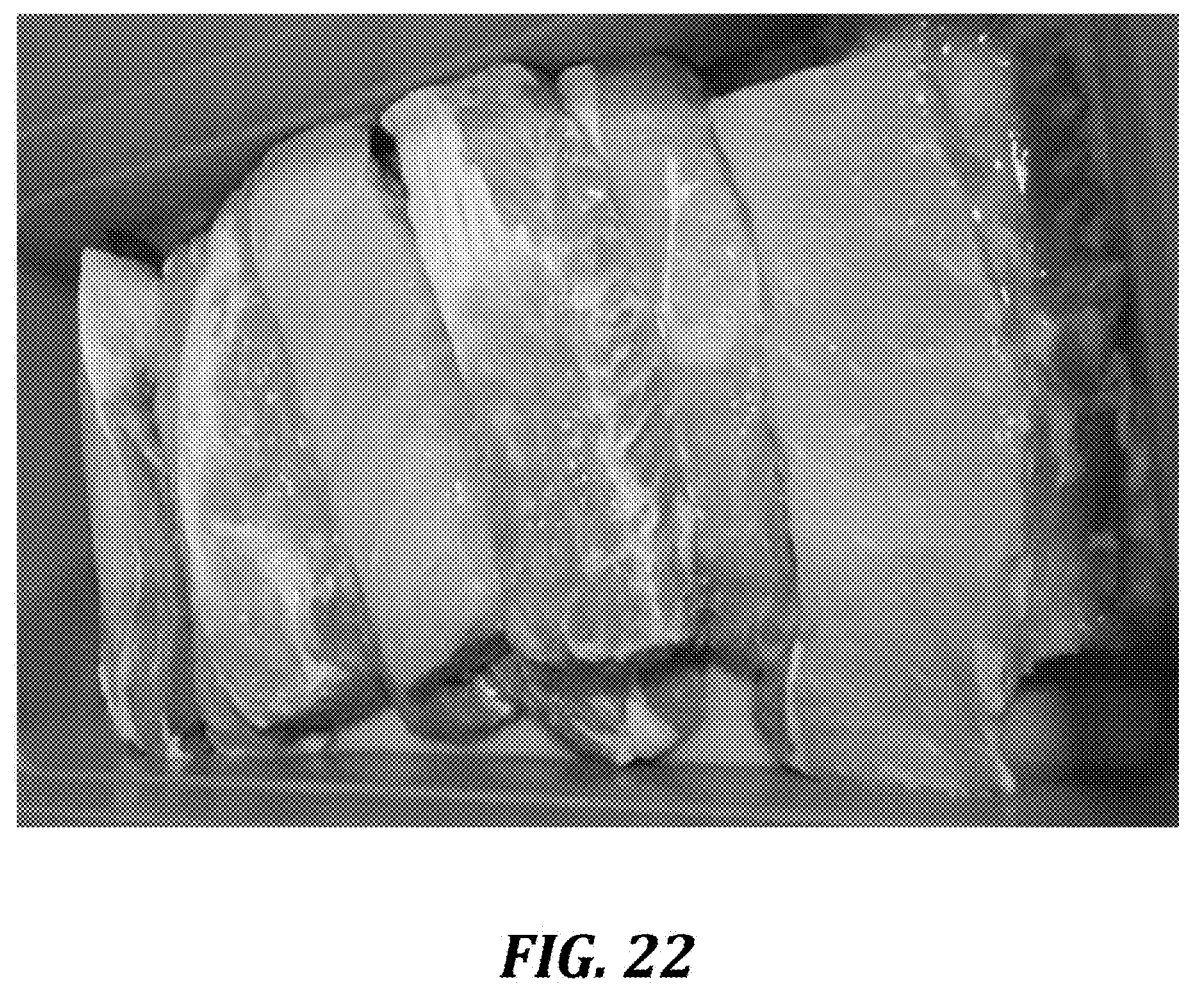
Figure 25:
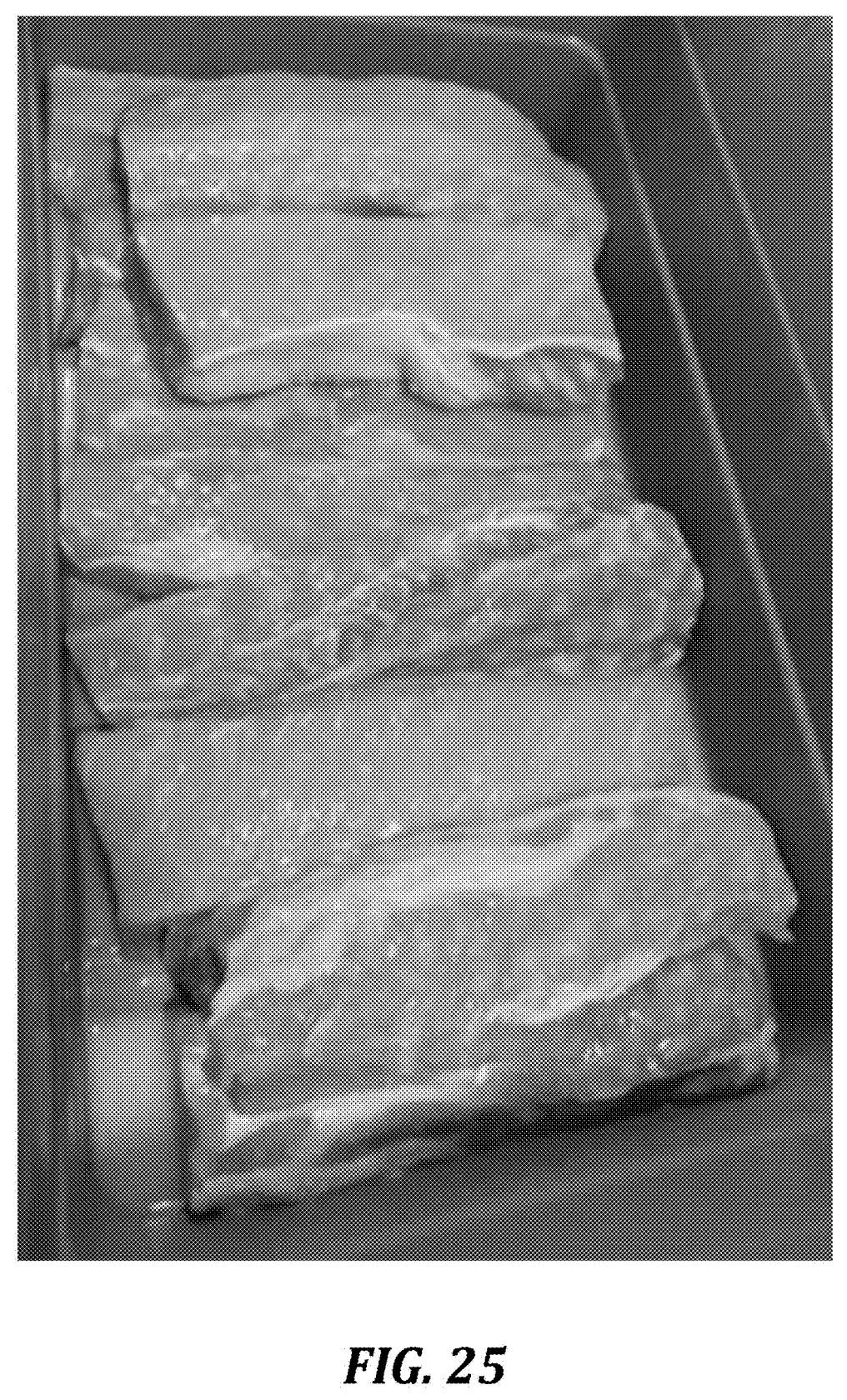
Figure 26:
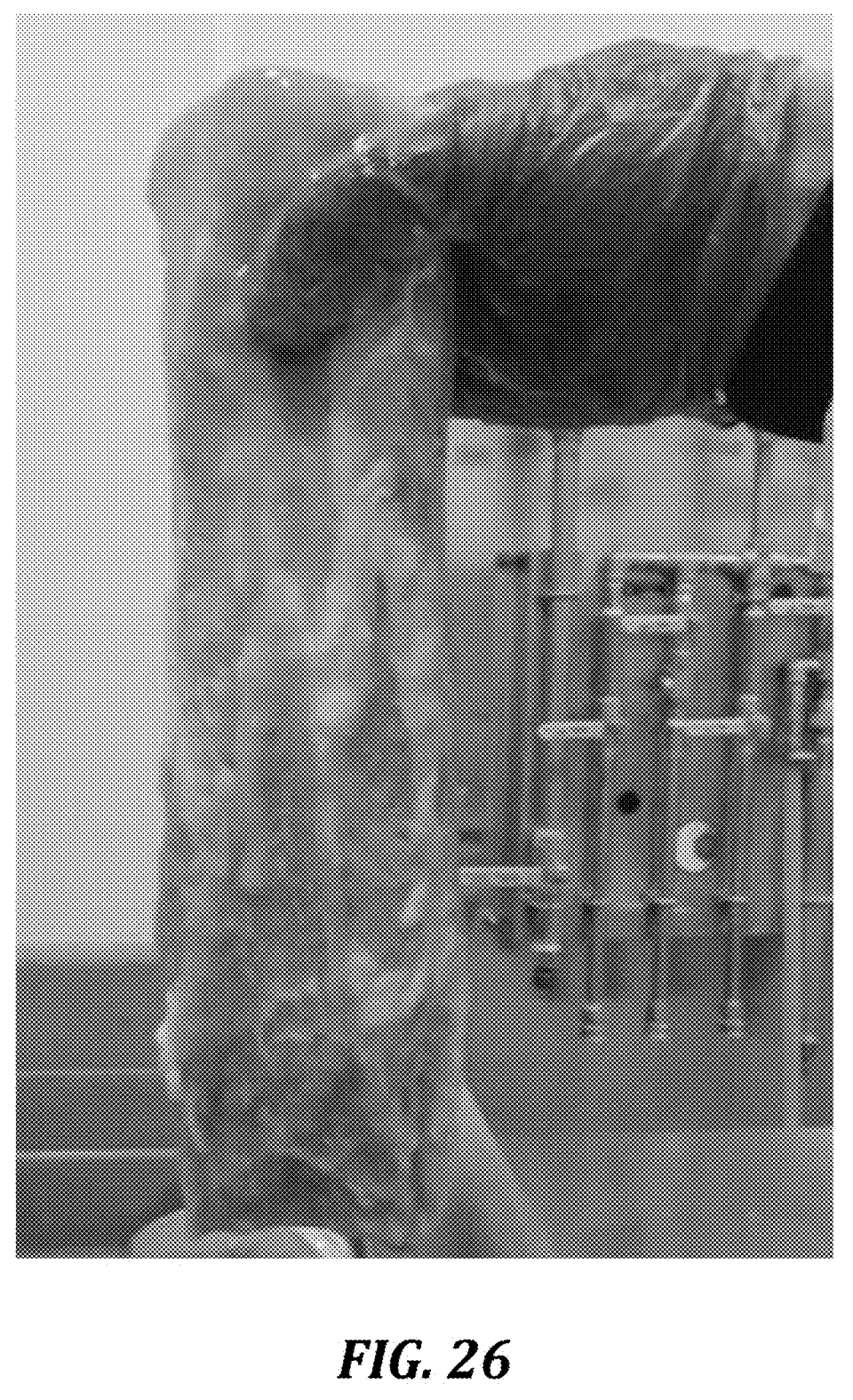

FIGS. 19, 22, 25, and 26 show pork loins split into ham end loins and blade end loins;

Figure 20:
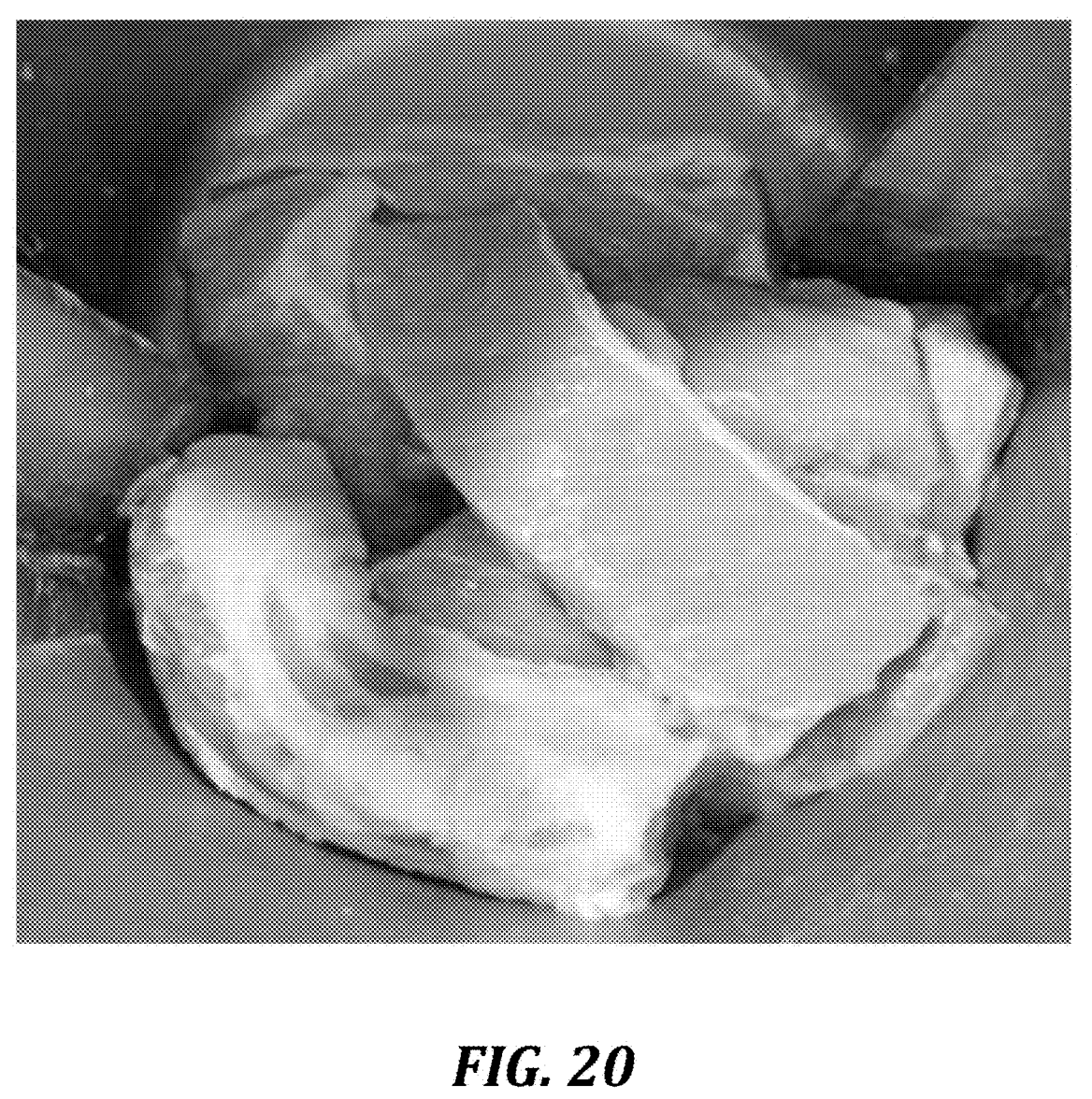
Figure 23:
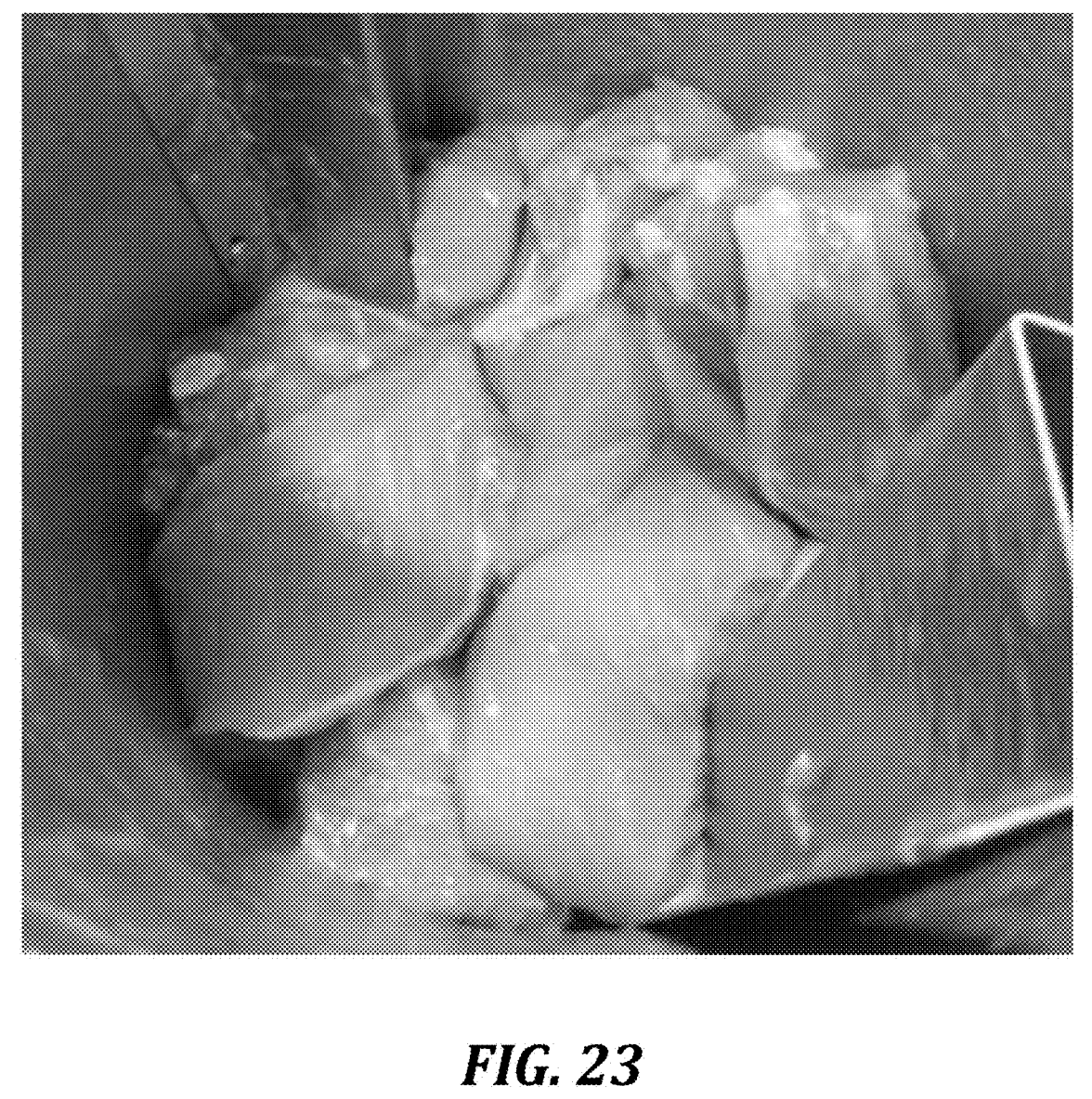

FIGS. 20, 21, 23, 24 and 27-29 show pork loins that have been injected with a natural protein brine with and without salt and then massaged and then vacuum packed for later evaluation;

FIGS. 30-37 show chicken butterfly breasts injected with a natural protein and was brine, then tumbled for 10 minutes in a tabletop tumbler and thereafter portioned into strips with a water jet portioner;

FIGS. 38 and 39 show a plant-based product injected with a marinade containing an animal-based broth, vegetable oil and water, with a dye used to show the dispersion of the marinade in the plant based product;

FIGS. 40 and 41 show a plant-based product to simulate chicken after marinading and slicing;

FIGS. 42A-42E show views of a hypodermic type needle for use with injecting marinade into plant-based materials;

DETAILED DESCRIPTION

Figure 5:
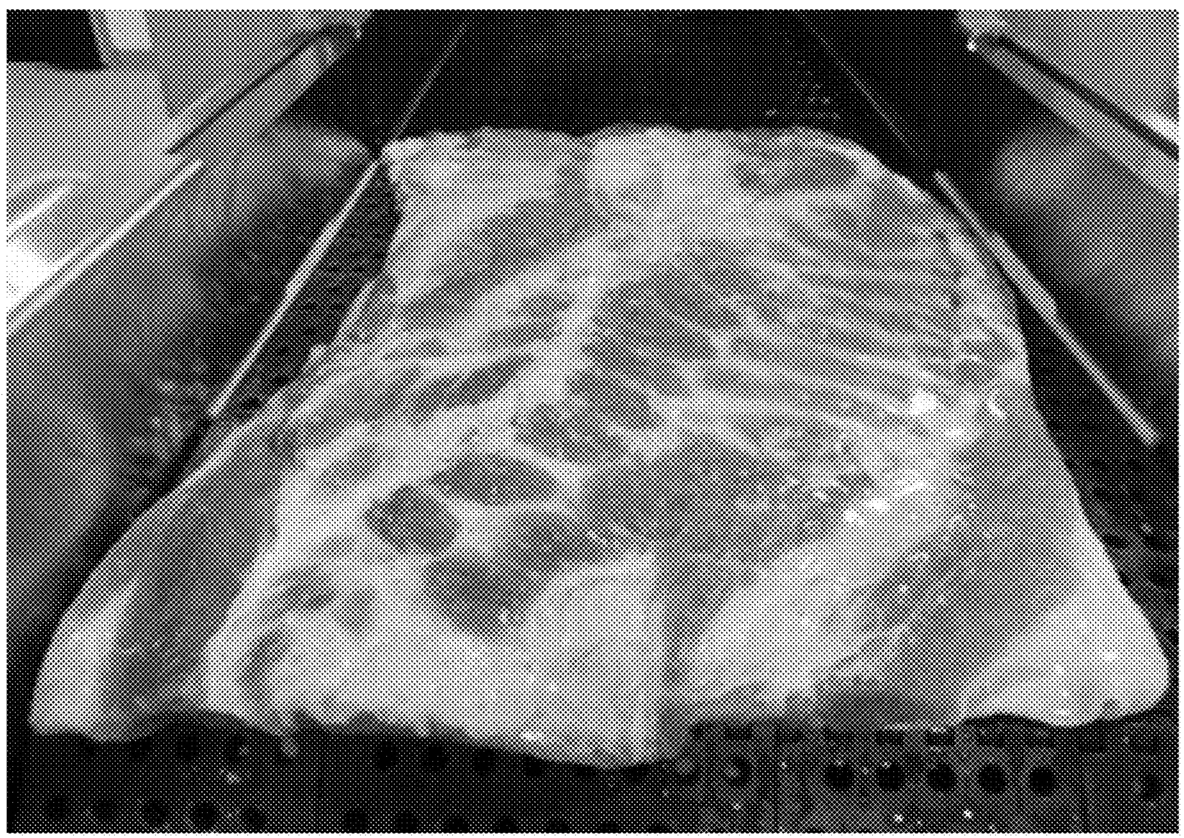
FIG. 5 is a photograph of a pork belly that has been injected with a clear brine.
Figure 9:
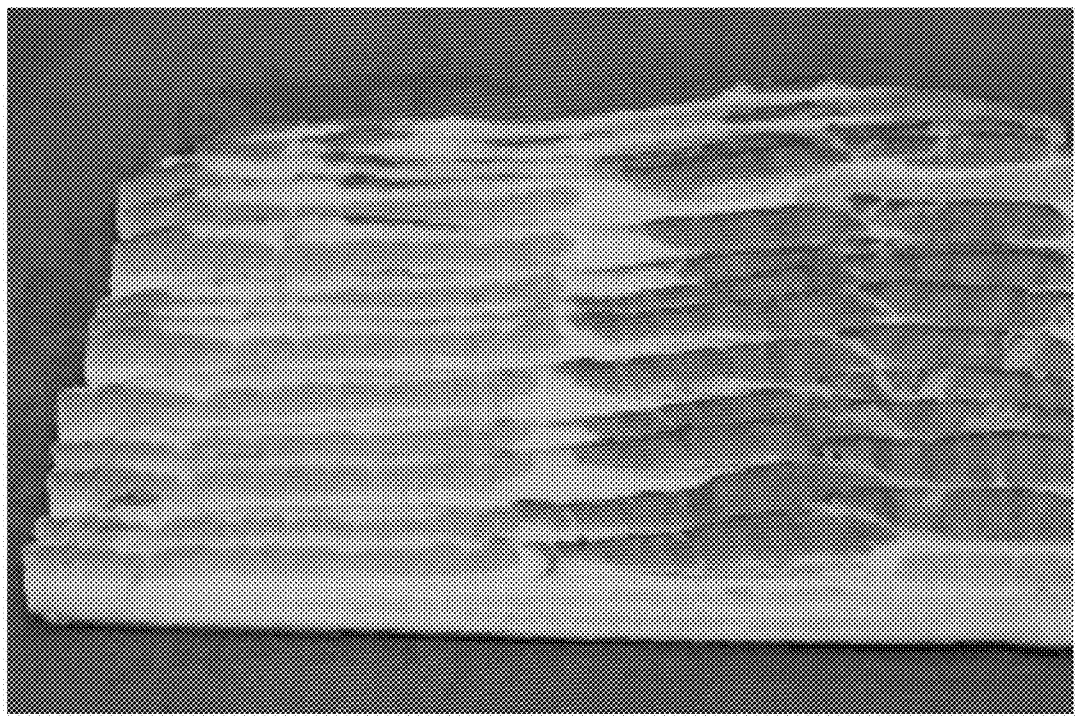
FIG. 9 is a photograph of a sliced pork belly that had been injected with a clear bring solution to serve as a control sample
Figure 10:
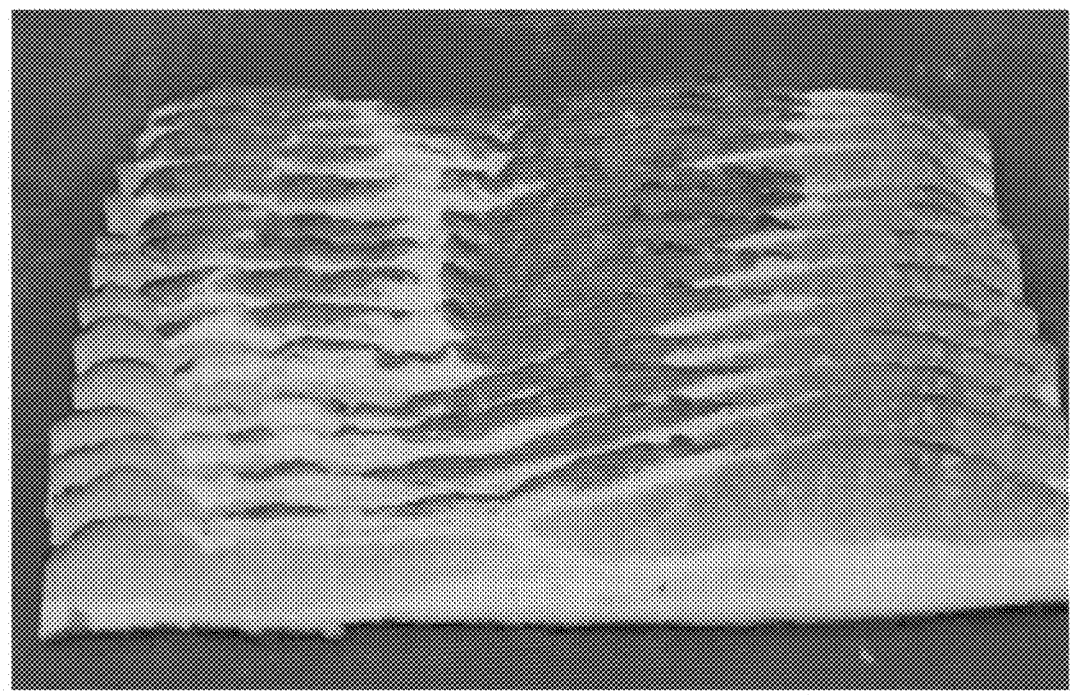
FIG. 10 is a photograph of a sliced pork belly that had been injected with a natural protein brine in an amount of 7% by weight.
Figure 11:
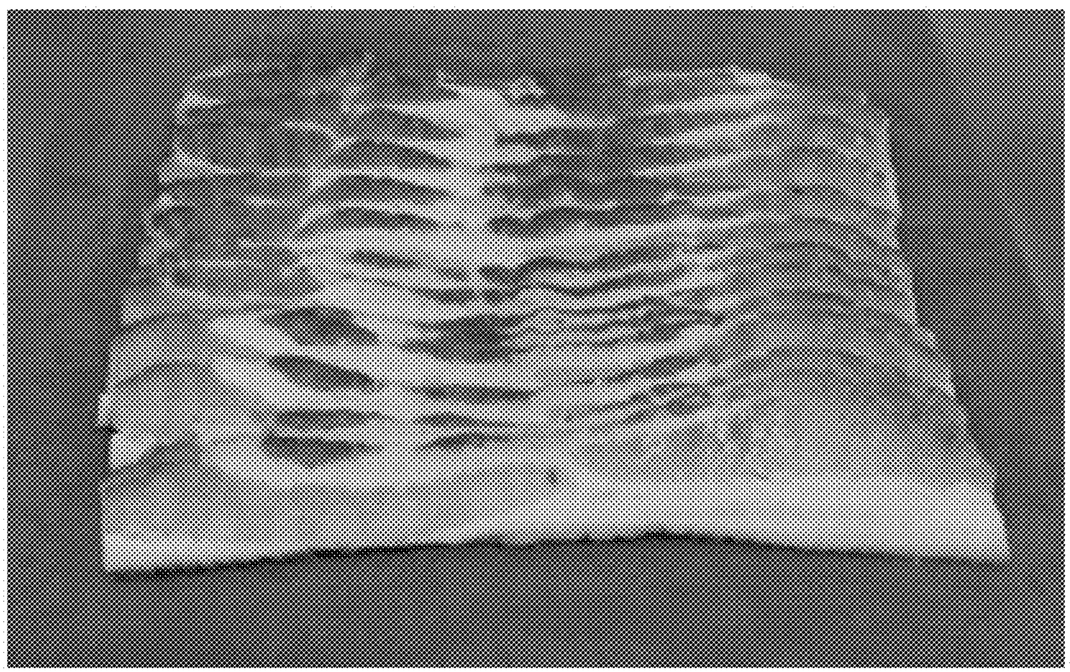
FIG. 11 is a photograph of a sliced pork belly that had been injected with a natural protein brine in an amount of 10% by weight.
Figure 12:
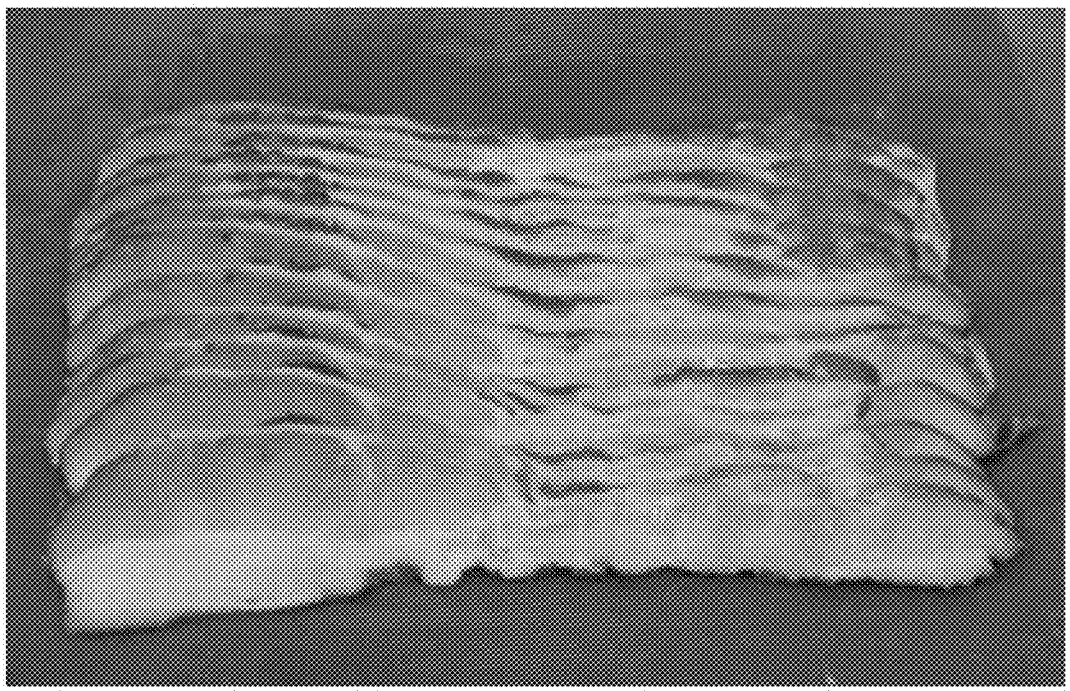
FIG. 12 is a photograph of a sliced pork belly that had been injected with a natural protein brine in an amount of 12% by weight.
Figure 13:
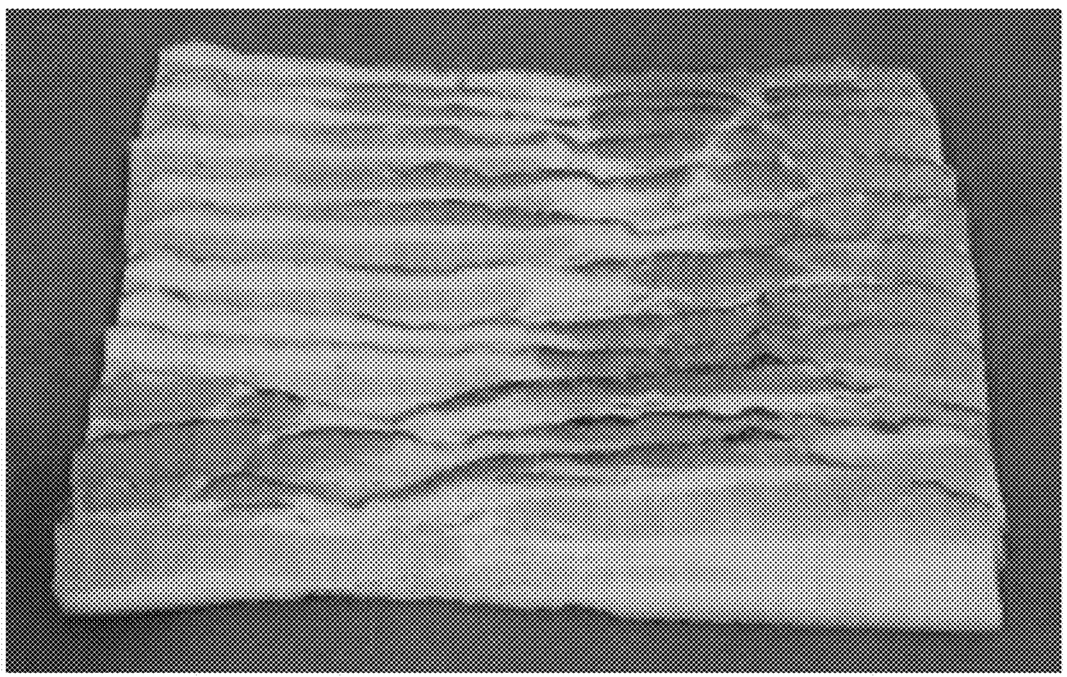
FIG. 13 is a photograph of a sliced pork belly that had been injected with a combination of natural protein brine and clear brine.
Figure 14:
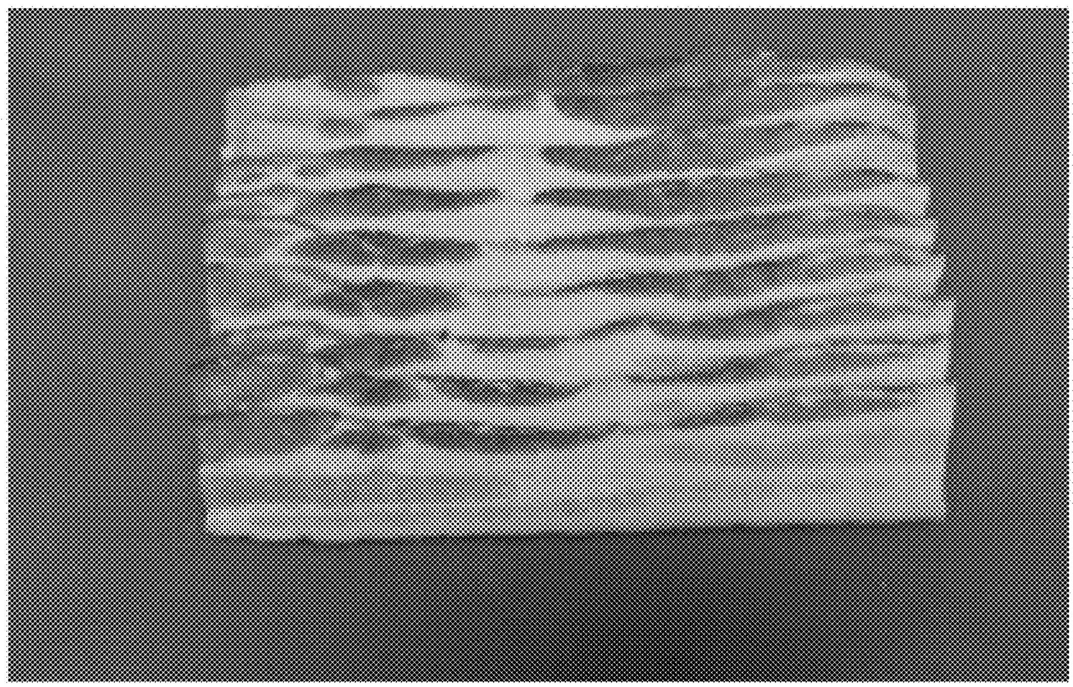
FIG. 14 is a photograph of a sliced pork belly that had been injected with a combination of a natural protein brine and clear brine in an amount of 17.45% by weight and thereafter massaged.
Figure 15:
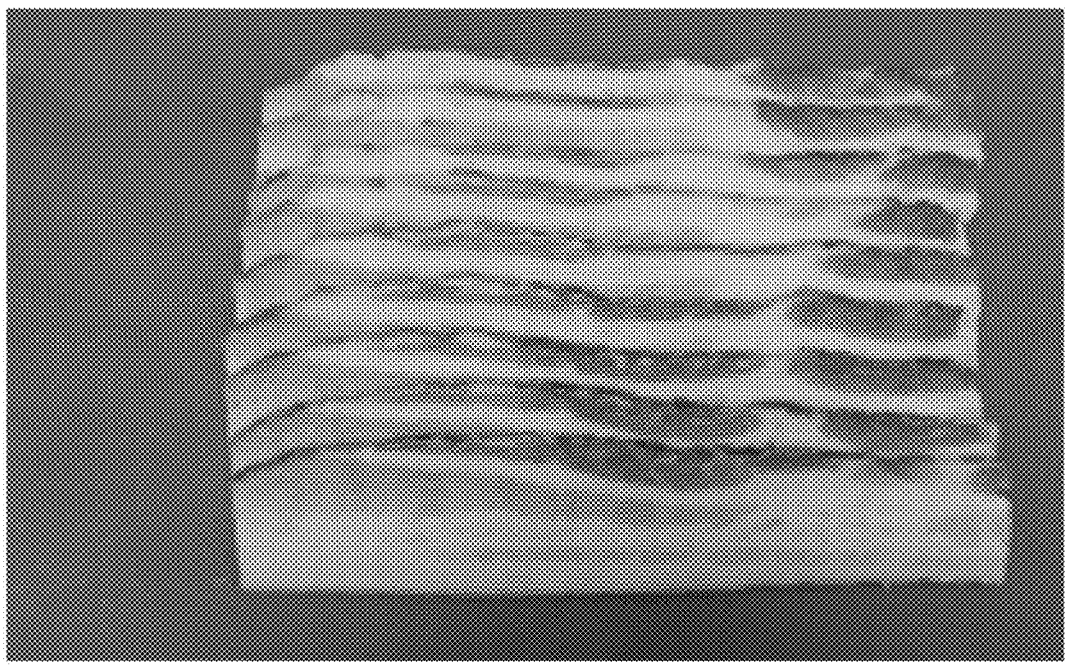
FIG. 15 is a photograph of a sliced pork belly that had been injected with a combination of a natural protein brine and clear brine in an amount of 19.56% by weight.
Figure 16:
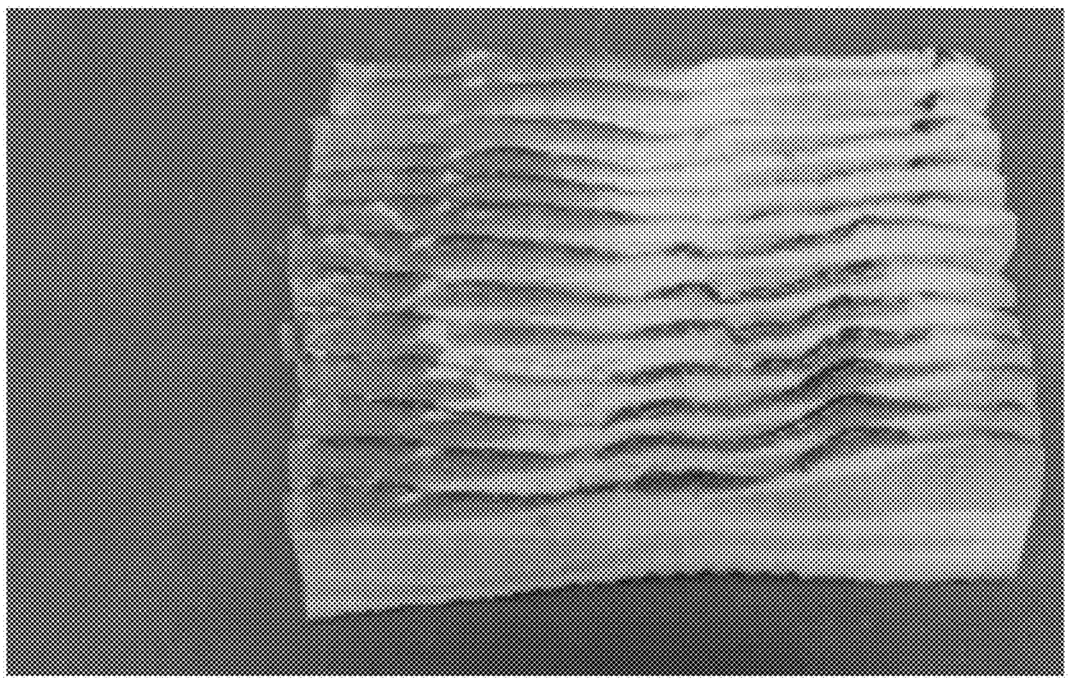
FIG. 16 is a photograph of a sliced pork belly that had been injected with a combination of a natural protein brine and clear brine in an amount of 18.40% by weight and thereafter massaged.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." these references and other similar references in the present application are only to assist in helping describe and understand the present disclosure and are not intended to limit the present invention to these directions.

The present application may include modifiers such as the words "generally," "approximately," "about," or "substantially." These are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

In the present application the terms "functional protein" or "protein composition" or "natural protein" or "active protein" or "natural active protein" mean protein that corresponds to that which is naturally occurring in the food product, whether a beef, pork, poultry, fish, plant-based product or otherwise.

In the present application the term "bacon brine" also is commonly referred to in the art as "bacon cure" or "bacon pickle."

In the present disclosure the terms "brine" and "marinade" and "pickle" are considered to be synonymous terms.

In the present disclosure, the terms "salt" and "sodium" and "sodium chloride" are considered to be synonymous terms.

Unlike typically the case, the brines and marinades of the present disclosure are composed of no or low levels of salt and no phosphates, which have been staple components of existing brines. Phosphates have been needed to "open" the muscle fibers of the food product and the salt has been needed to extract the protein from the muscle fibers so as to be available to bind with the liquid component of the brine/marinade. Absent the use of the salt and phosphates, the brine/marinade simply leaches or purges back out of the food product, for example, during cooking or the muscle binding of deli meats, or even prior thereto.

In accordance with the present disclosure, the salt is completely or substantially replaced with the naturally occurring active protein of the food product. Likewise, the phosphate commonly used in brines/marinades is also replaced with the naturally occurring active protein update food product. The naturally occurring active protein is able to bind with the liquid portion of the brine/marinade, typically at least as effectively as the combination of salt and phosphate.

The naturally occurring active protein can be derived from the substrate of the food product being brined/marinaded. For example, the substrate can be composed of trimmings (beef, pork, chicken, turkey, fish, plant-based protein material) left over from the portioning of the food product. The substrate trimmings can be ground up and then an emulsion formed with water so the emulsion is injectable into the food product.

For animal or fish food products, the substrate consists of the muscle of the food product. As such the active protein, derived from the muscle, consists primarily myofibrillar protein and sarcoplasmic protein. The proportion of myofibrillar protein and sarcoplasmic protein in the brine corresponds to the proportion naturally occurring in the corresponding type of food product bring brined/marinated. Further, the muscle protein can consist of from 0.5% to 15% of the weight of the food product being brined/marinated or from 2% to 30% of the weight of the brine/marinade.

The proteins of plant food products are mostly globulins and albumins. The proportion of globulin protein and albumin protein in the brine/marinade corresponds to the proportion naturally occurring in the corresponding type of food product bring brined/marinaded. Further, the plant protein can consist of from 0.5% to 15% of the weight of the food product being brined/marinated or from 2% to 30% of the weight of the brine/marinade.

As noted above, the food product substrate is mixed with water to form the brine/marinade emulsification. Water will comprise a significant proportion of the brine, typically from about 70 to 90% of the brine. The water may be softened or otherwise purified or treated, for example, by reverse osmosis. Part of the water may be provided in the form of ice to result in a brine temperature after emulsification that is below 32° F. Desirably, the temperature of the brine at the time of injection into the poultry substrate will be from about 24° to 32° F. It is desirable that the brine does not facilitate bacteria growth in the poultry between injection and prior to cooking or other processing of the food product. One way to address this issue is to maintain the brine temperature below the temperature of the food product being treated.

Various flavorings, including, for example, seasonings, spices, and juices, may be utilized in the brine so as to achieve a desired taste or flavor for the food product. The flavoring can make up from about 1% to 25% of the brine by weight. Many different flavorings, spices, seasonings, and juices can be used. The following are a few examples: sugar, pepper, garlic (dehydrated, minced, fresh), parsley, thyme, mulling spices, chamushka (seeds), coriander (seeds), cinnamon, fennel (seeds), mustard (ground, seeds, etc.), old spice (berries), ginger (with or without the skin), Bengal bay, cumin (seeds), blade mace, cardamom (seeds), chilis, lemon (peel or juice), mint, bay leaf, anise (seeds), lime (peel or juice), orange (peel or juice), pomegranate, molasses, curry, ajowan (seeds), cloves, honey, vinegar, yogurt, etc. The foregoing listing is not meant to be inclusive or limiting. Also, the spices and herbs and other flavorings can be fresh or dehydrated.

A thickener may optionally be added to the brine. One type of possible thickener is a hydrocolloid such as gelatin, agar, or starch, such as rice starch. The thickening agent may be used in an amount from about 1 to 4% by weight of the brine. Of course, an amount of the thickening agent beyond this range may also be utilized. Applicant has found that use of functional protein in the brine can reduce or even eliminate the need for a thickening agent in the brine.

The brine may also optionally utilize a preservative or antioxidant. One example is sodium erythorbate. This compound serves as a preservative, but also assists in flavor stability of the poultry. Other preservatives, for example, sodium lactate, sodium diacetate, dried vinegar or a lemon-based product, may be used in place of sodium erythorbate. Sodium erythorbate may be employed in the brine in quantities of from about 0.2% to 0.5% of the brine by weight.

Various amounts of brine as prepared using the present disclosure may be injected into the food product. The quantity of brine may from about 8% to 100% of the weight of the food product. As a more specific example, the quantity of brine may from about 15% to 25% of the weight of the food product. As another more specific example, the quantity of brine may be from about 17% to 22% of the weight of the food product. Specific examples of the amounts of brine utilized are provided below.

The brine is injected into the food product by an array of injection needles supported by a carrier of an injection system. As is standard, the needle carrier includes a feeder supply chamber connected to a source of brine and in brine flow communication with the injection needles.

An injection system suitable for injecting brines of the present disclosure is disclosed by US 2022/0110348 A1, which is incorporated herein by reference. The disclosed injection needles advantageously reduce the shear stress placed on the brine during injection relative to needles of other construction. This has the advantage of minimizing the loss of functionality of the active protein in the brine. Further, heat build-up in the needles is kept to a minimum. Such heat can denature, or otherwise damage, the active protein in the brine.

The construction of the injection needles are shown and described in Example 6 below. In this regard, at least two different injection needle constructions are shown and described. One needle configuration in in the form of a hypodermic needle, having an outlet opening at the bottom or distal end of the needle tip. The needle configuration is capable of directing brine downward into the food product. A second needle configuration has one or more side outlets, at a location spaced above the bottom or distal end of the needle tip, to release brine sideways out of the needle. This needle configuration functions well to direct the brine sideways into the food product from the one or more needle side outlets.

As can be appreciated a needle array that uses both types of needles can advantageously be employed to distribute the brine uniformly throughout the depth or thickness of certain types of food products, for example, plant-based food products. The needles with the side outlets distribute the brine throughout the upper portion of the food product, while the needles with the bottom or distal end of the tip opening distribute the brine throughout the lower portions of the food product.

Further, the brine injections system utilizes a diaphragm pump rather than a centrifugal pump or other type of pump utilizing a rotating impeller that continuously cuts through the brine. The diaphragm pump need only operate when called upon to direct the brine through the injection needles. As such, less shear stress placed on the brine during injection into the food product.

Example 1: Phosphate Free, Reduced Sodium Ham

Overview

With respect to fresh meats, deli chicken, deli turkey and roast beef, it was considered acceptable from a flavor perspective to not use salt in the brine, since as these products typically do not have a salty flavor. However, ham, pastrami and corned beef typically have a distinctive salty aftertaste. The thought was to replace the sodium chloride with potassium chloride. A trial was set up to produce a ham product with no added sodium or phosphate.

Test Plan

A brine solution was made for this testing using natural function pork protein. The water and ingredients were combined to prepare the ham brine solution. Pork knuckle insides and outsides were then injected to a target of 30% brine by weight. The injected food product was macerated and then injected into to the pork knuckles, insides and outsides. Following injection, the injected and macerated pork knuckles were then loaded into a massager. After the massage cycle, the pork knuckles were stuffed into fibrous casings to form hams. The hams were held overnight to develop cure color and then cooked in the steam kettle the next day.

Brine Formulation

Ham Brine

| Ingredients | % in Final | % in Brine |
|---|---|---|
| Water | 5.27% | 22.84% |
| Potassium Chloride | 1.30% | 5.64% |
| Dextrose | 1.00% | 4.33% |
| Celery Powder | 0.50% | 2.17% |
| Total | 23.07% | 100.00% |

As discussed above the functional protein formulation consists primarily of ground up substrate emulsified in water. The amount of substrate can be from 15 to 25% and the amount of water can correspondingly be from 85 to 75%.

Test Observations and Data

The emulsified functional protein formulation was made up and then mixed with water and the other brine ingredients. The brine solution was tasted, and unfortunately it had an overpowering bitterness from the potassium chloride. The concern here was this “off” flavor would be obvious in the finished ham product.

A decision was then made to make a very low sodium brine for ham. The updated brine formulation is listed in the table below.

| Adjusted Ham Brine 27% Injection Target | | |
|---|---|---|
| Ingredients | % in Final | % in Brine |
| Water | | 81.73 |
| Functional Protein | 2.3% | 10.00% |
| Salt | 0.75% | 3.55% |
| Sugar | 0.90% | 4.25% |
| Sodium carbonate | 0.02% | 08% |
| Sodium Nitrite | 0.012% | 0.06% |
| Sodium Erythorbate | 0.054% | 0.26% |
| Citric Acid | 0.02% | 0.08% |
| Total | | 100.00% |

The following is the composition of a standard brine for ham

| Ham Brine 27% Injection Target | | |
|---|---|---|
| Ingredients | % in Final | % in Brine |
| Water | 17.07 | 84.64 |
| Salt | 1.85% | 8.70% |
| Sugar | 0.90% | 4.25% |
| Sodium Phospate | 0.45% | 2.10% |
| Sodium Nitrite | 0.012% | 0.06% |
| Sodium Erythorbate | 0.054% | 0.26% |
| Total | | 100.00% |

Sodium Nitrite was used instead of the celery powder due to the unavailability of celery powder, which functions as a natural curing agent.

The pork knuckles' muscles were injected to 30% using a needle injection system and then macerated. See FIG. 1. The pork knuckles were then massaged for 90 minutes using the temperature guidance program and then stuffed into fibrous casings to form ham logs. See FIG. 2. The ham logs were held over night before cooking in 180-degree water to an internal temperature of 165 degrees. After cooking the hams logs were placed in the cooler over night before recording yield numbers.

Yield Data

| Log Number | Green Wt | Stuffed Wt | Cooked Wt | Cook Yield | Yield to Green |
|---|---|---|---|---|---|
| 1 | 6.94 | 9.02 | 8.46 | 93.79% | 121.90% |
| 2 | 7.92 | 10.3 | 9.79 | 95.05% | 123.61% |
| 3 | 6.91 | 8.98 | 8.32 | 92.65% | 120.41% |
| 4 | 7.34 | 9.54 | 8.77 | 91.93% | 119.48% |
| Average | 29.11 | 37.84 | 35.34 | 93.39% | 121.40% |

Product Cutting

The ham logs had bound together very well. The ham was sliced paper thin with the tabletop slicer. See FIG. 3. The product was tasted and found to have a very pleasing mild ham flavor.

Conclusion

This test used a brine without phosphate and very low added sodium. The brine used a sodium reduction of 61% compared to an average ham product.

“All Natural” hams without phosphate are currently produced, but higher levels of salt are needed to extract protein and bind water. On the other hand, “water added” hams are not made this way, as the extra water simply cannot be bound without phosphate.

This test created a ham that yielded 21% above green weight. This would give a PFF (Protein Fat Free) in the category of “water added” ham. As such, this ham could be labeled as:

Uncured,
All Natural Water added, and/or
Reduced sodium, less sodium or lower in sodium Example 2: Pork Belly Processing without Phosphate Background In the processing of pork bellies to produce bacon, a brine is typically injected into the pork belly which contains components for both curing and flavoring the bacon resulting from the pork belly. Under U.S. government regulations, the net weight of the cured and smoked pork belly must be no greater than the initial weight of the green pork belly. This limits the quantity of the brine that can be injected into the green pork belly. The present test seeks to inject functional protein without the presence of phosphates into a pork belly substrate so that the net weight of the cured and smoked pork belly is greater than the initial green weight of the pork belly, while meeting U.S. government regulations. A successful result would reduce the cost of the brine formulation and allow this product to be labeled phosphate free or "all natural."

Test Objective

To determine the yield advantage that can be obtained when a natural protein injection step is added into a bacon process, but without the use of phosphate.

Treatments

Week 1

Control Test

Natural Protein Test w/Massage 7%—50 needle manifold
Natural Protein Test w/Massage 10%
Natural Protein Test w/Massage 12%
Natural Protein and Clear Brine Combined—102 needle manifold Week 2

Natural Protein and Clear brine Combination Injected only—50 needle manifold
Natural Protein and Clear brine Combination Inject and Massage—50 needle manifold Week 1

Control Test

The pork bellies for this test were injected with the clear brine solution using an UltraCat to a target of 12%. After injection, the bellies allotted to this test were placed in the cooler prior to having a portion of this test cooked/smoked in a wood pellet smoking grill. The bellies that were smoked were cut in half to be able to fit more pork bellies per cook.

Protein Tests

The pork bellies assigned to these tests were injected with a natural protein brine solution using an IMAX350 HVB injector to a target of either 7%, 10%, or 12% by weight. After the natural protein brine injection, the pork bellies were held in the cooler for about an hour. After the hold period, the pork bellies were taken out of the cooler and injected with clear brine to a target of 12% by weight, Following this injection, the bellies were massaged for 5 minutes. After the massage, the pork bellies were cut in half and labeled to identify each test. The pork bellies were smoked in the wood pellet smoking grill for 4 hours. After the smoke cycle, the bellies were sliced, and a small sample was cooked in a test kitchen. See FIGS. 4-8.

Natural Protein and Clear Brine Combination

The pork bellies that are designated for this test were injected using an IMAX350 HVB injector to a target of 17.5%-19% with a brine solution that is a combination of natural protein brine (27.7%) and clear brine (72.3%). Following injection, the pork bellies were massaged for 5 minutes, and then were portioned and smoked in a wood pellet smoking grill for 4 hours. Thereafter, the pork bellies were cooked, sliced and evaluated for sensory attributes.

Week 2

Natural Protein and Clear Brine Combination Injected Only

The bellies for this test were injected using an IMAX350 HVB injector to a target of 17.5%-19% by weight with a brine that is a combination of natural protein solution (27.7%) and standard clear brine (72.3%). Following injection of the pork bellies, the bellies were reweighed to determine the injection percentage.

The injected pork bellies were cut in half and the portions cooked/smoked for 4 hours on the wood pellet smoker grill. Thereafter, the pork bellies were cooked, sliced, and evaluated for sensory attributes.

Natural Protein and Clear Brine Combination Inject and Massage

The pork bellies designated for this test were injected using an IMAX350 HVB injector with a combination brine of natural protein and clear brine, 27.7% and 72.3% respectively. After injection, the pork bellies were massaged for 5 minutes. Following massage, the pork bellies were cut in half and cooked/smoked on the wood pellet smoking grill for 4 hours. Thereafter, the pork bellies were cooked, sliced and evaluated for sensory attributes.

Brine Formulations

Clear Brine Formula—Week 1

| Bacon Injection Formulation 12% Inject Target | | | |
|---|---|---|---|
| Ingredients | % in Final | % in Marinade | Lbs in Marinade |
| Water | | 74.43% | 372.15 |
| Salt | 1.60% | 14.93% | 74.65 |
| Phosphate | 0.40% | 3.73% | 18.65 |
| Sugar | 0.50% | 4.67% | 23.35 |
| Cure Salt | 0.20% | 1.87% | 9.35 |
| Erythorbate | 0.04% | 0.37% | 1.85 |
| Total | | 100.00% | 500.00 |

Clear Brine Formula—Week 2

| Bacon Injection Formulation 12% Inject Target | | | |
|---|---|---|---|
| Ingredients | % in Final | % in Marinade | Lbs in Marinade |
| Water | | 75.36% | 113.04 |
| Salt | 1.50% | 14.00% | 21.00 |
| Phosphate | 0.40% | 3.73% | 5.60 |
| Sugar | 0.50% | 4.67% | 7.00 |
| Cure Salt | 0.20% | 1.87% | 2.80 |
| Erythorbate | 0.04% | 0.37% | 0.56 |
| Total | | 100.00% | 150.00 |

Protein Brine Composition

| Ingredients | % in Final |
|---|---|
| Water | 3.63% |
| Salt | 1.5% |
| Sugar | 0.8% |
| Flavoring | 0.0% |
| Cure Salt | 0.012% |
| Erythorbate | 0.0547 |
| Natural Protein Composition | 10% |

Data Collection
Injector Settings

| IMAX 350HVB Injector Settings | | | | | |
|---|---|---|---|---|---|
| Test | Speed | Pressure | Injection Mode | Advance | Stripper Holes |
| Natural Protein Test w/ Massage (7%) | 9 | 1.0 Bar | 1 Way | Full | 1 Hole Exposed |
| Natural Protein Test w/ Massage (10%) | 9 | 1.4 Bar | 1 Way | Full | 1 Hole Exposed |
| Natural Protein Test w/ Massage (12%) | 9 | 1.7 Bar | 1 Way | Full | 1 Hole Exposed |
| Natural Protein and Clear Brine Combo | 9 | 1.3 Bar | 1 Way | Full | 1 Hole Exposed |
| Natural Protein and Clear Brine Combo | 9 | 1.6 Bar | 1 Way | Full | 1 Hole Exposed |

| UltraCat Injector Settings | | | | | |
|---|---|---|---|---|---|
| Test | Speed | Pressure | Injection Mode | Advance | Delay |
| Control | 38 Strokes | 35-40 psi | Double Pump | 8 Inches | None |
| Natural Protein Test w/ Massage (7%) | 20 Strokes | 45 psi | Double Pump | 8 Inches | None |
| Natural Protein Test w/ Massage (10%) | 42 Strokes | 35 psi | Double Pump | 8 Inches | 0.03 Seconds |
| Natural Protein Test w/ Massage (12%) | 42 Strokes | 35 psi | Double Pump | 8 Inches | 0.03 Seconds |

| Massager Settings (All Tests) | | | | |
|---|---|---|---|---|
| Time | Speed | Direction | Vacuum | Heat/Cool |
| 5 Minutes | 10 RPM | Reverse | 100% | None |

Injection Data
Week 1

| UltraCat Clear Brine Injection | | | | | |
|---|---|---|---|---|---|
| Test | Green Wt | Inject Wt | % Inject | Out of Massager Wt | Overall Pickup |
| Control | 18.81 | 21.19 | 12.65% | — | 12.65% |

| Natural Protein Injection Data | | | | | |
|---|---|---|---|---|---|
| Test | Green Wt | Inject Wt | % Inject | Out of Massager Wt | Overall Pickup |
| Natural Protein Test w/ Massage (7%) | 19.15 | 20.62 | 7.68% | 20.08 | 4.86% |
| Natural Protein Test w/ Massage (10%) | 21.48 | 23.74 | 10.52% | 23.03 | 7.22% |
| Natural Protein Test w/ Massage (12%) | 21.20 | 23.92 | 12.83% | 23.30 | 9.91% |

| UltraCat Clear Brine Injection Data | | | | | | | |
|---|---|---|---|---|---|---|---|
| Test | True Green Wt | Green Wt | Inject Wt | % Inject | 10 Min Drain | Overall Pickup | Combined Pickup |
| Natural Protein Test w/ Massage (7%) | 19.15 | 19.98 | 22.82 | 14.21% | 22.25 | 11.36% | 16.19% |
| Natural Protein Test w/ Massage (10%) | 21.48 | 22.96 | 26.32 | 14.63% | 25.35 | 10.41% | 18.02% |
| Natural Protein Test w/ Massage (12%) | 21.20 | 23.23 | 26.79 | 15.33% | 25.86 | 11.32% | 21.98% |

| Natural Protein Injection Data | | | | | |
|---|---|---|---|---|---|
| Test | Green Wt | Inject Wt | % Inject | Out of Massager Wt | Overall Pickup |
| Natural Protein and Clear Brine Combination | 17.49 | 20.86 | 19.27% | 20.78 | 18.81% |

Week 2

| Combination Brine Injection Data | | | | | |
|---|---|---|---|---|---|
| Test | Green Wt | Inject wt | % Inject | Out of Massager Wt | Overall Pickup |
| Natural Protein and Clear Brine Combo non massaged | 11.86 | 14.18 | 19.56% | 14.14 | 19.22% |
| Protein and Clear Brine Combo Massaged | 23.44 | 27.76 | 18.43% | 27.53 | 17.45% |

Cook Data

Week 1

| Cook Data (Same Day) | | | | | |
|---|---|---|---|---|---|
| Test | Green Wt | Inject Wt | Cook Wt | Cook Yield | Yield to Green |
| Control | 4.81 | 5.42 | 4.85 | 89.48% | 100.8% |
| Natural Protein Test w/Massage (7%) | 5.13 | 5.71 | 5.15 | 90.19% | 100.4% |
| Natural Protein Test w/Massage (10%) | 5.38 | 5.94 | 5.36 | 90.24% | 99.6% |
| Natural Protein Test w/Massage (12%) | 5.57 | 6.20 | 5.50 | 88.71% | 98.8% |
| Natural Protein and Clear Brine Combo | 4.48 | 5.09 | 4.57 | 89.78% | 102.0% |

| Cook Data (Overnight Hold) | | | | | |
|---|---|---|---|---|---|
| Test | Green Wt | Inject Wt | Cook Wt | Cook Yield | Yield to Green |
| Control | 5.23 | 5.89 | 5.21 | 88.46% | 99.6% |
| Natural Protein Test w/ Massage (7%) | 5.40 | 6.01 | 5.39 | 89.68% | 99.9% |
| Natural Protein Test w/ Massage (10%) | 5.94 | 6.56 | 5.96 | 90.85% | 100.3% |
| Natural Protein Test w/ Massage (12%) | 5.91 | 6.58 | 5.93 | 90.12% | 100.3% |
| Natural Protein and Clear Brine Combo | 5.12 | 5.82 | 5.30 | 91.07% | 103.5% |

*The green weight in the Natural Protein Tests above were calculated as the weight of the pork bellies after the Natural Protein injection. Therefore, the green weight of the pork bellies were increased so that when the yield to green in these tests were similar to the control they were actually greater than the control test.

Week 2

| Cook Data (Same Day) | | | | | |
|---|---|---|---|---|---|
| Test | Green Wt | Inject Wt | Cook Wt | Cook Yield | Yield to Green |
| Natural Protein and Clear Brine Combo Inject only | 6.01 | 6.81 | 6.22 | 91.34% | 103.5% |
| Natural Protein and Clear Brine Combo Inject and Massage | 12.59 | 14.10 | 12.88 | 91.35% | 102.3% |

*The green weight in the Natural Protein tests above were calculated as the weight of the pork bellies after the Natural Protein injection. Therefore, the green weight of the pork bellies were increased so that when the yield to green in these tests were similar to the control they were actually greater than the control test.

See FIGS. 10-16.

Results

As it can be seen from the injection data above, the control test had an injection percentage of 12.65% and after cooking on the same day, the yield to green percentage was 100.8% and the overnight hold resulted in a yield to green percentage of 99.6%.

The Natural Protein tests had target injection levels of 7%, 10%, and 12%, which was achieved with 7.68%, 10.52%, and 12.83% being the actual injection levels after injection on the IMAX350 HVB injector. The retention of the Natural Protein solution after massage was 4.86%, 7.22%, and 9.91% for the Natural Protein 7%, Natural Protein 10%, and Natural Protein 12%, respectively. It was also possible to inject an additional 14.21%-15.33% of clear brine using the UltraCat injector. This resulted in a total combined pickup percentage of 16.19% for the Natural Protein Test 7%, a combined pickup percentage of 18.02% for the Natural Protein test 10%, and lastly a 21.98% combined total pickup for the Natural Protein test 12%. Looking at the data in the cook yield tables, it can be seen that the Natural Protein 7% test had a 100.4% yield to green, the Natural Protein 10% test had a 99.6% yield to green, and the Natural Protein 12% test had a 98.8% yield to green. Additionally, after the overnight hold, the Natural Protein 7% test had a yield to green of 99.9%, the Natural Protein 10% had a yield to green percentage of 100.3%, and the Natural Protein 12% had a yield to green percentage of 100.3%.

The green weight used to calculate the yield to green percentage was only before the clear brine injection. Therefore, an additional 4.86%, 7.22%, and 9.91% is to be added to the yield to green.

With respect to the combination brine test of Week 1, a pickup percentage of 18.81% was achieved. The yield to green percentage when cooked the same day was 102.0% and when cooked after the overnight hold was 103.5%. Lastly, when focusing attention on the Week 2 data, it can be seen that the combination brine that was not massaged had an injection percentage of 19.56% and the injected and massaged combination brine test had an overall pickup percentage of 17.45% after the massage. That resulted in a 103.5% yield to green percentage for the injected only test and 102.3% for the injected and massaged test.

When the test product is compared to the control data, it can be seen that the tests that were injected with Natural Protein prior to being injected with clear brine were able to match the control test which gave them a direct 4.86%, 7.22%, and 9.91% advantage over the control test having the natural protein injection process up front. Additionally, the tests where natural protein and clear brine were combined into a single formulation showed a 102.0% and 103.5% yield to green for the same day cook and the overnight hold, respectively. Lastly, the Week 2 data shows the combination Natural Protein brine without massaging resulted in 103.5% yield to green, and the combination Natural Protein brine with massage had a yield to green percentage of 102.3%. Therefore, all of the Natural Protein tests either injecting twice or a combination brine showed a large yield to green advantage.

Figure 17:
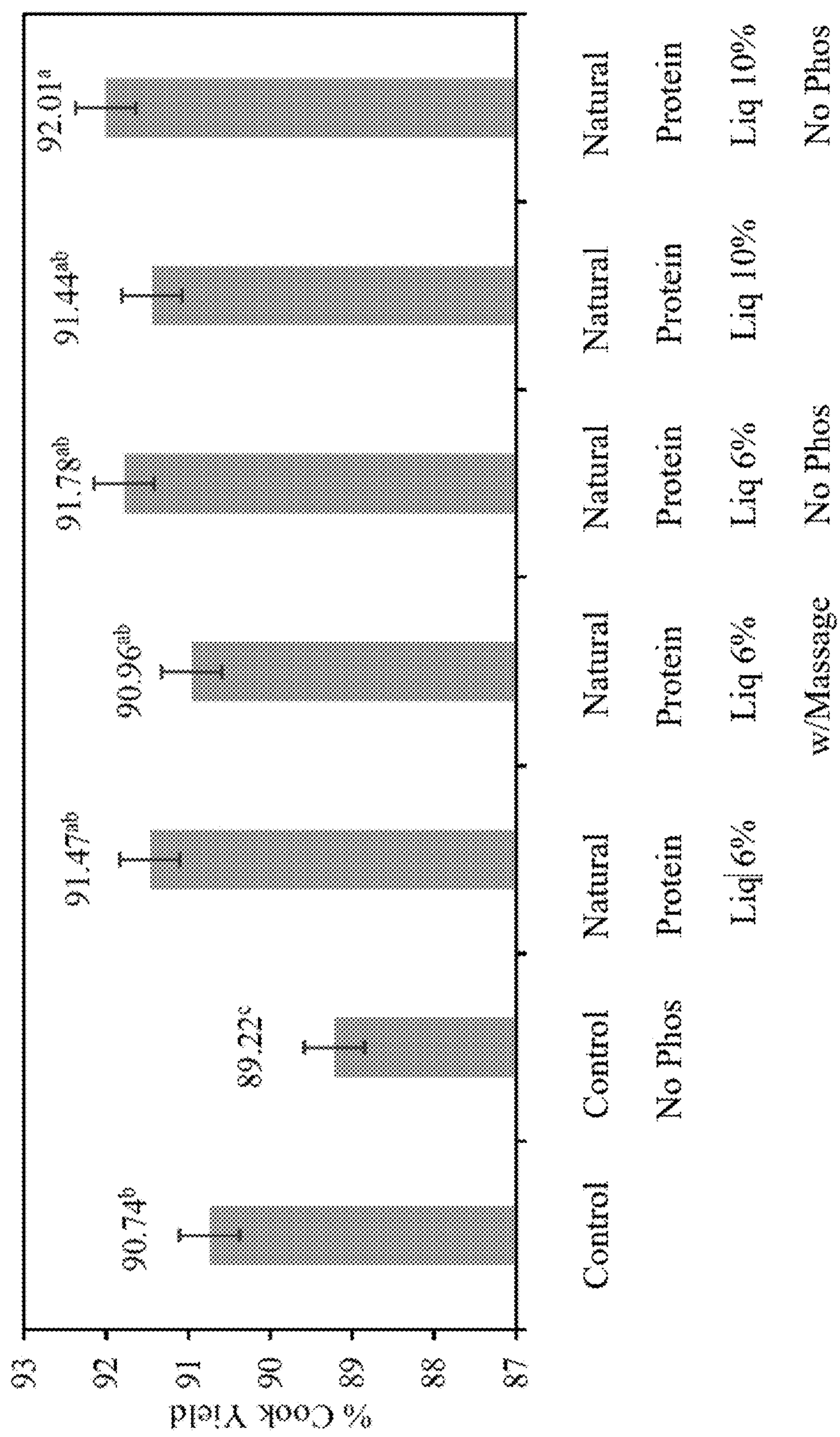
FIGS. 17 and 18 are tables showing the yield results of inducting pork bellies with a brine with phosphate and without phosphate.
Figure 18:
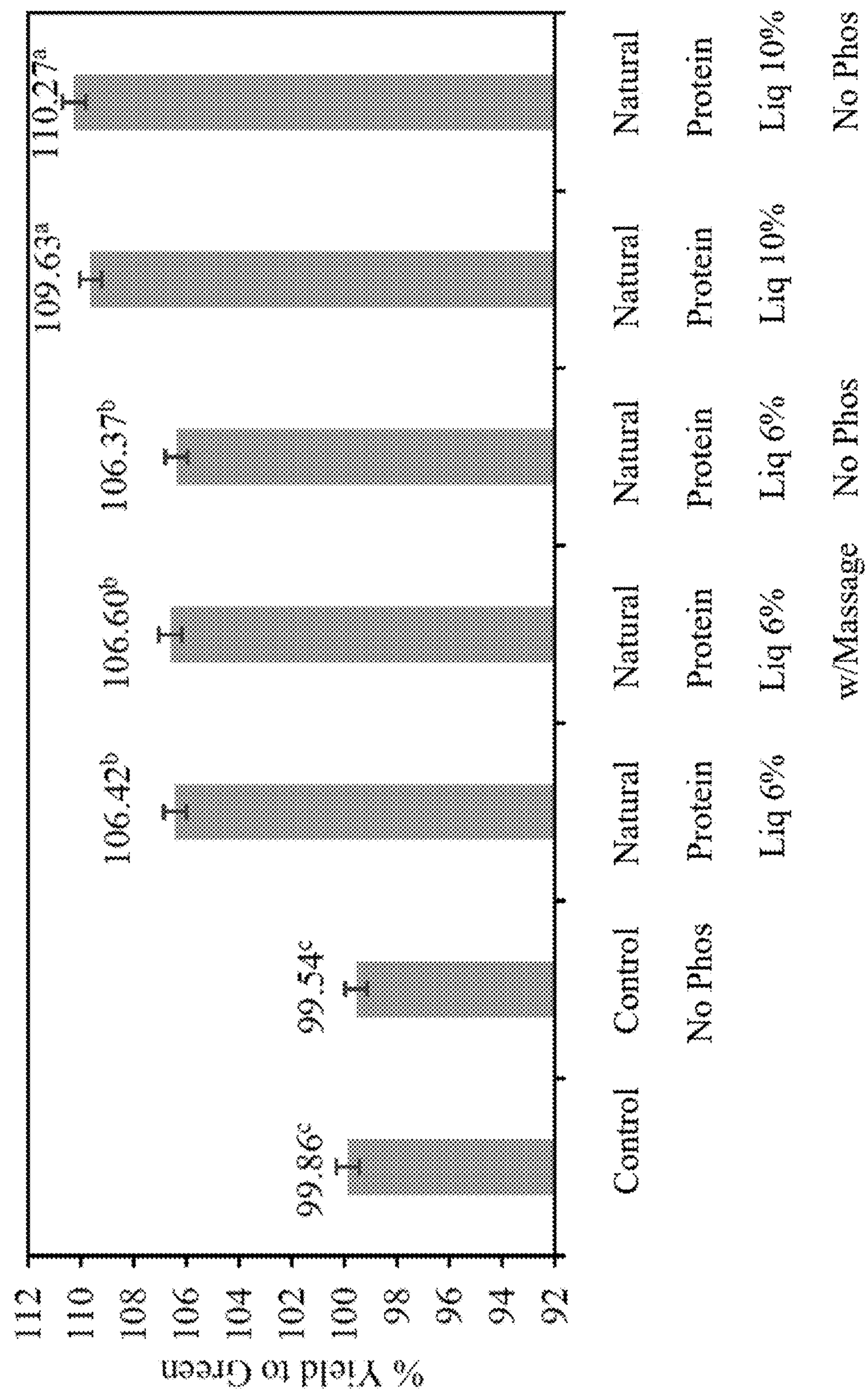
Figure 21:
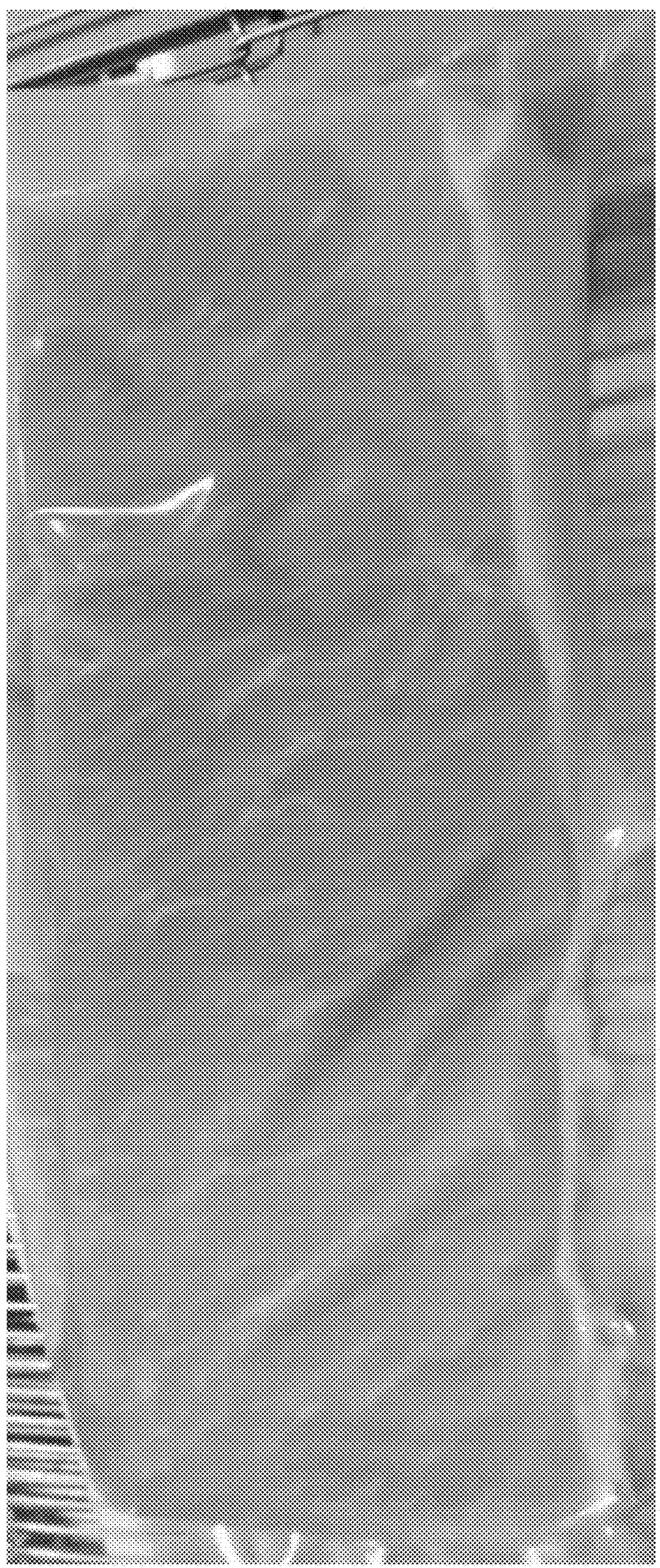
Figure 24:
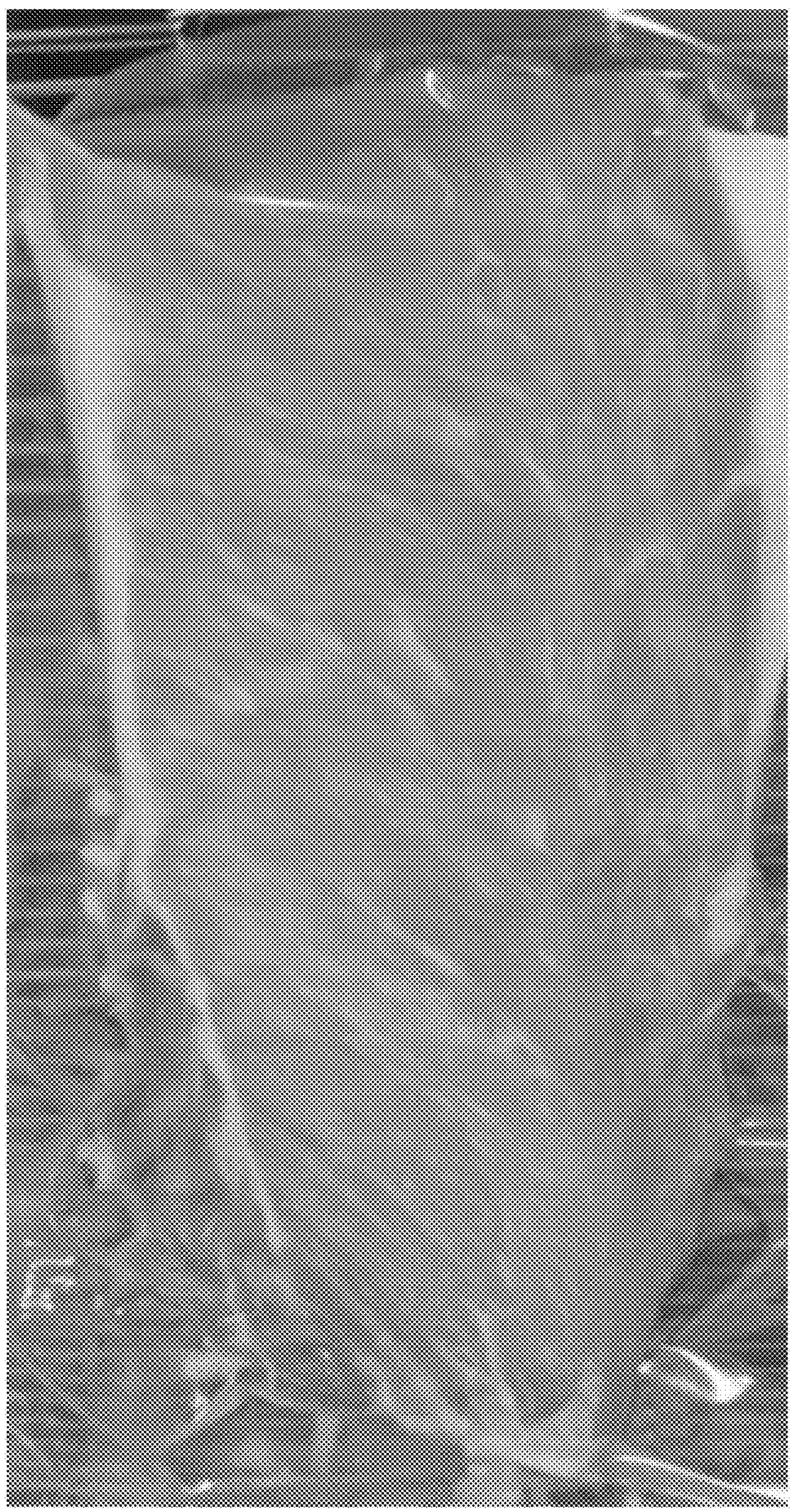
Figure 28:
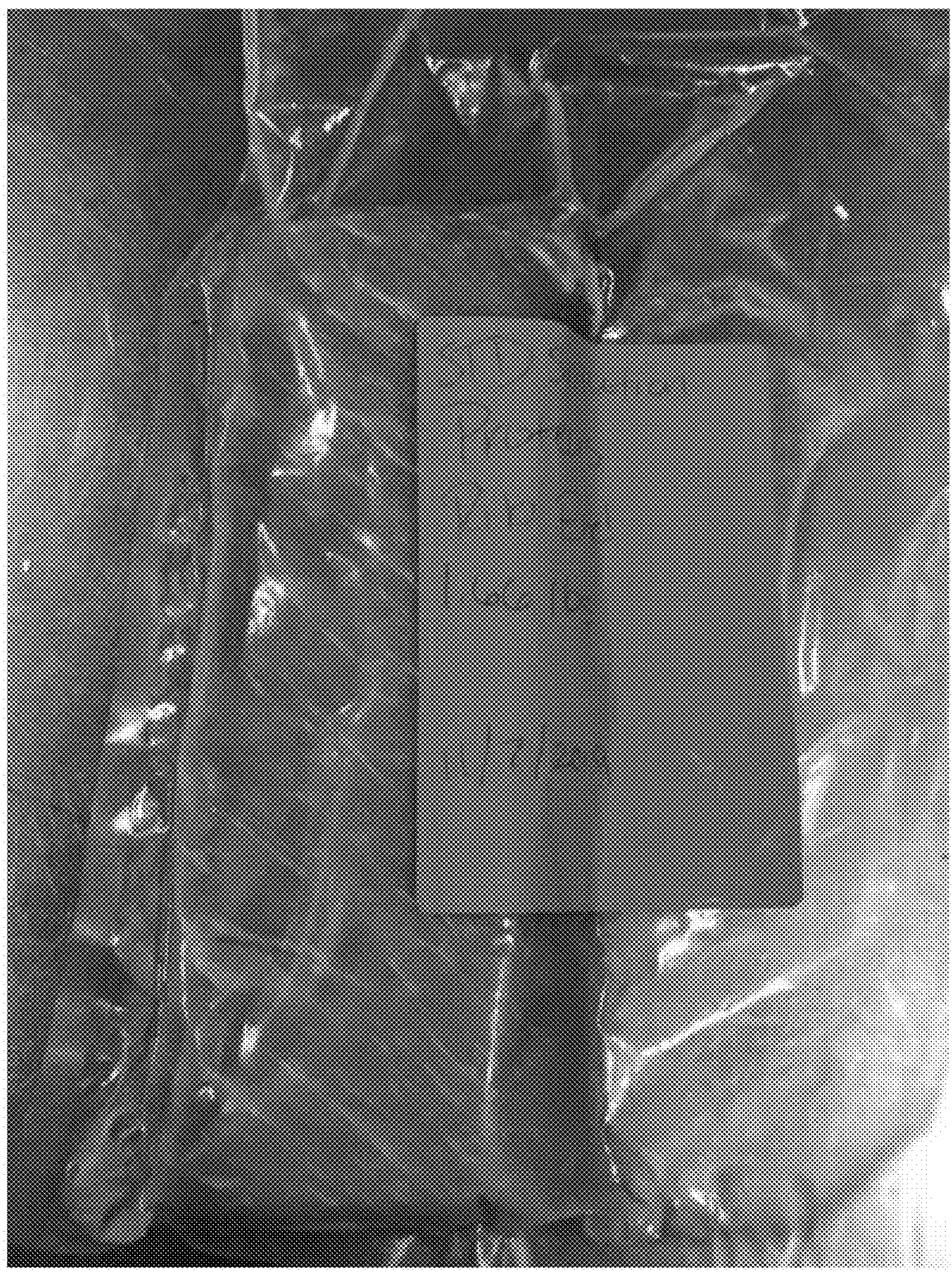
Figure 29:
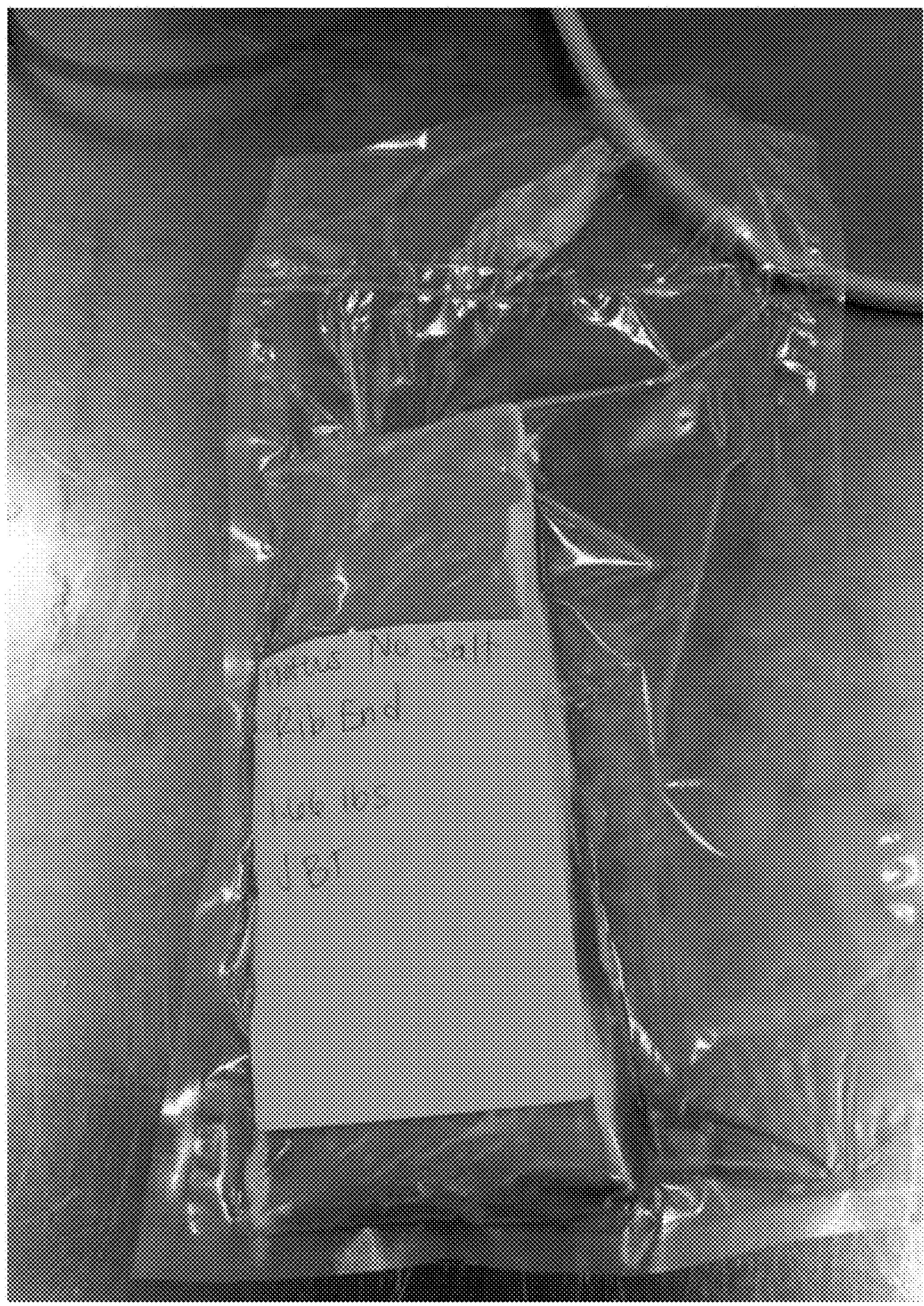
Figure 31:
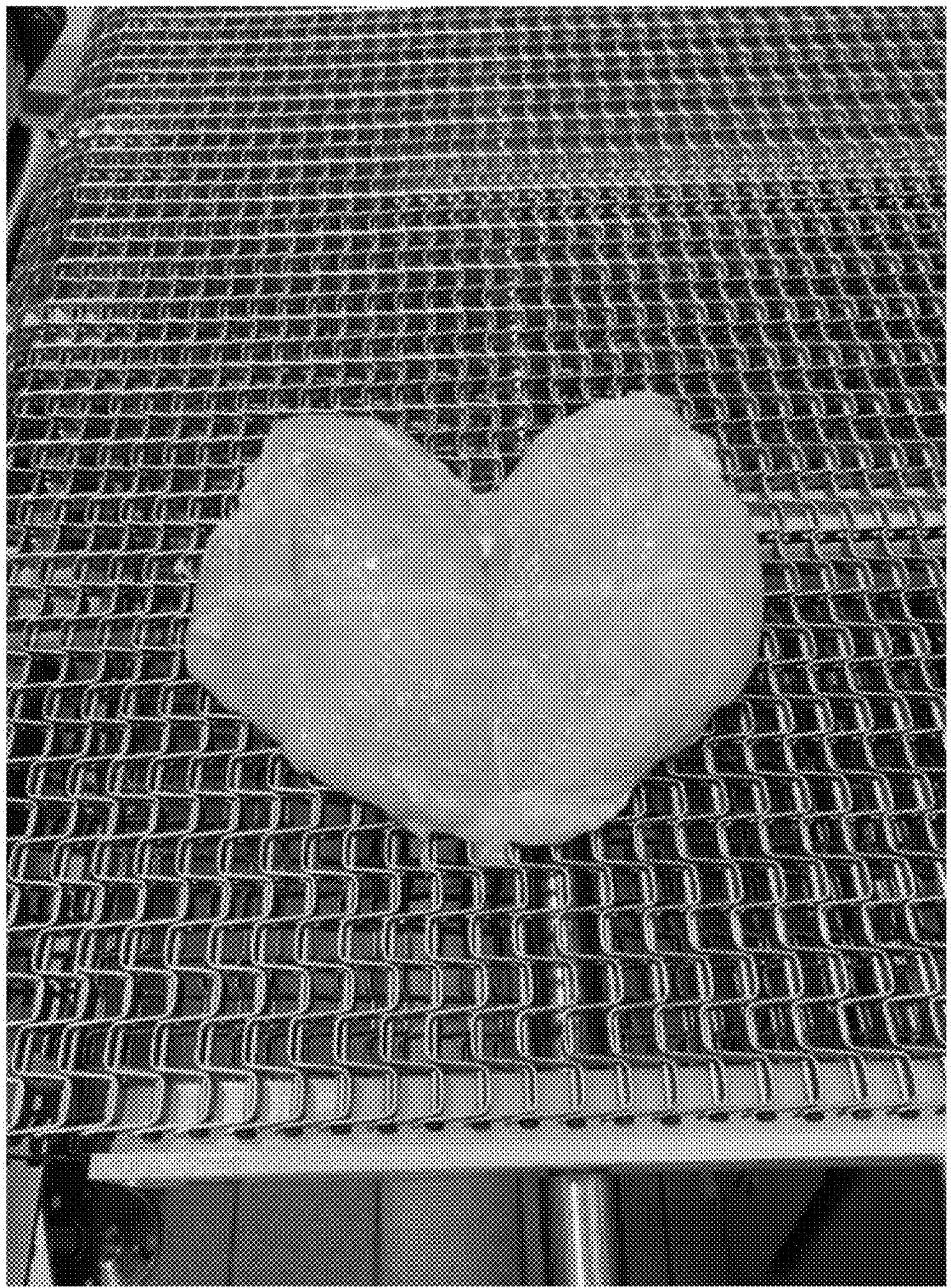
Figure 33:
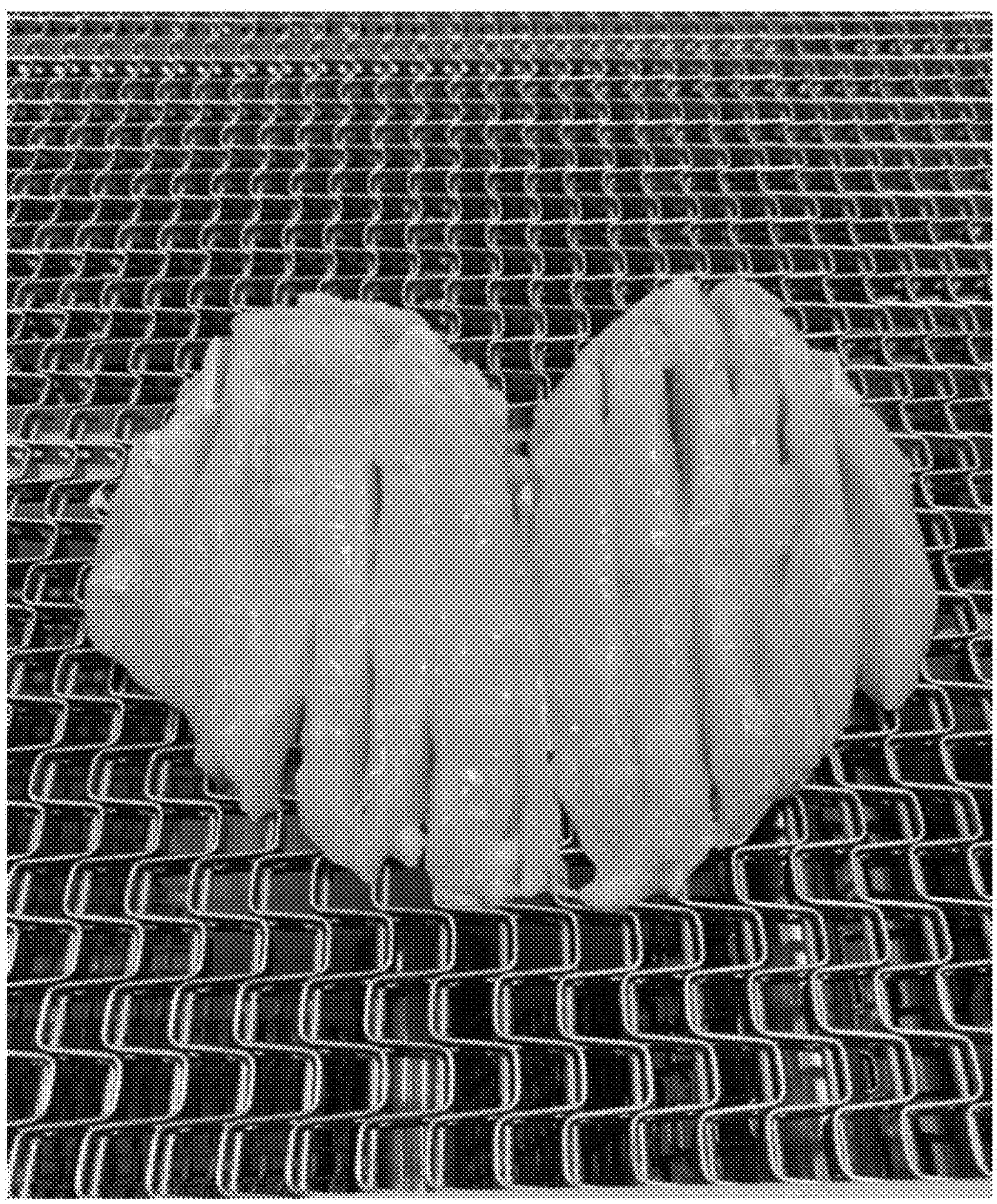
Figure 34:
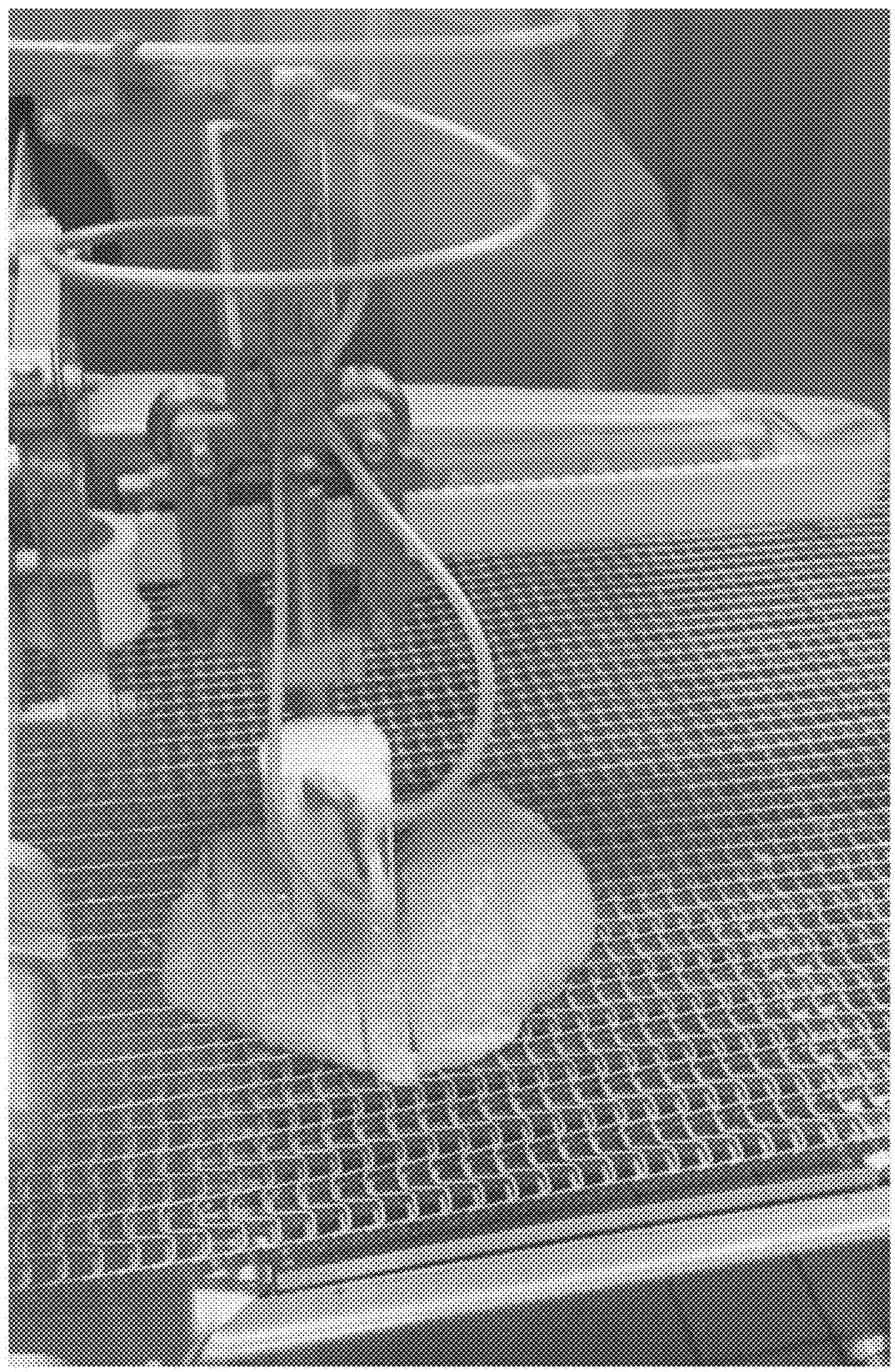
Figure 35:
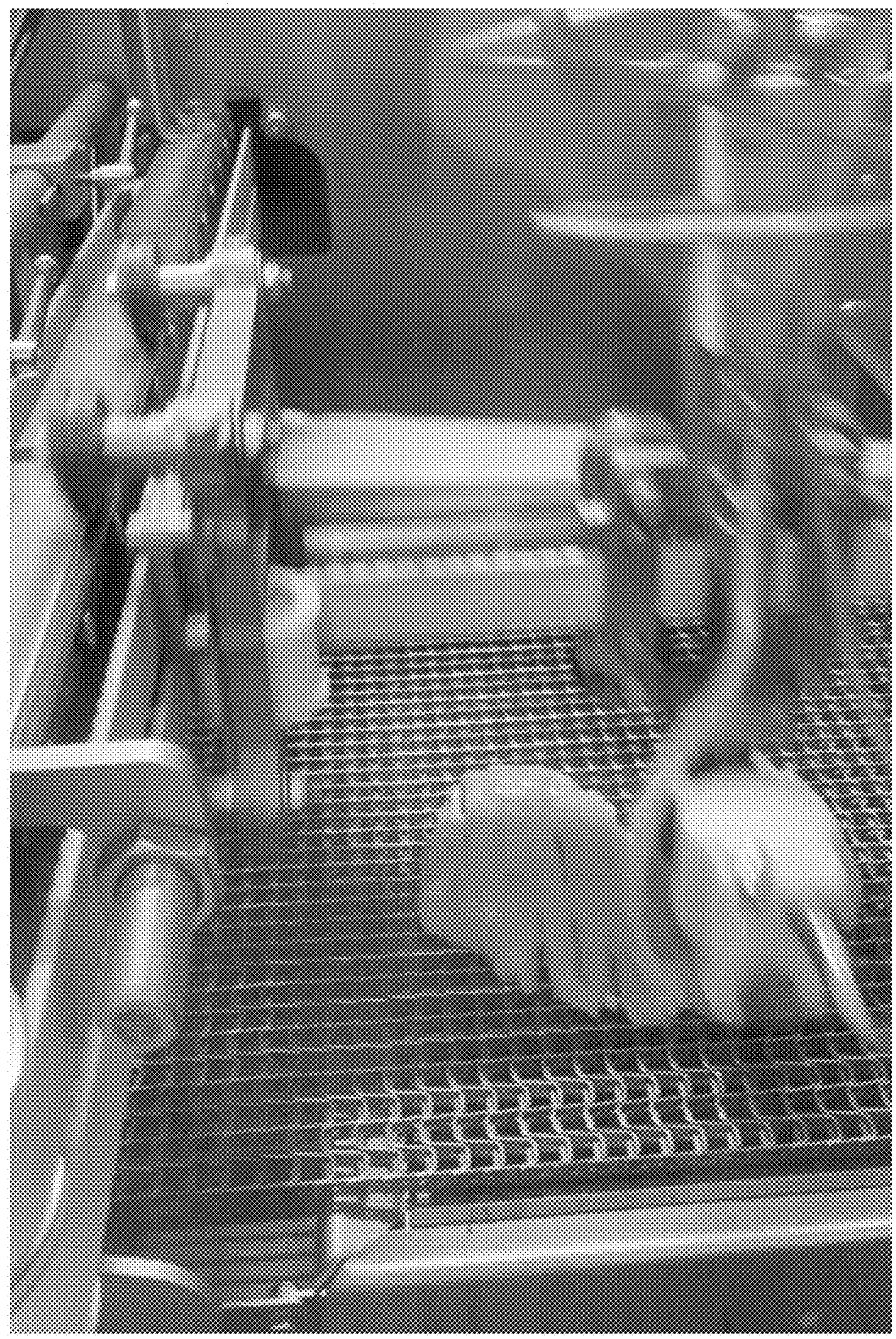
Figure 43A:
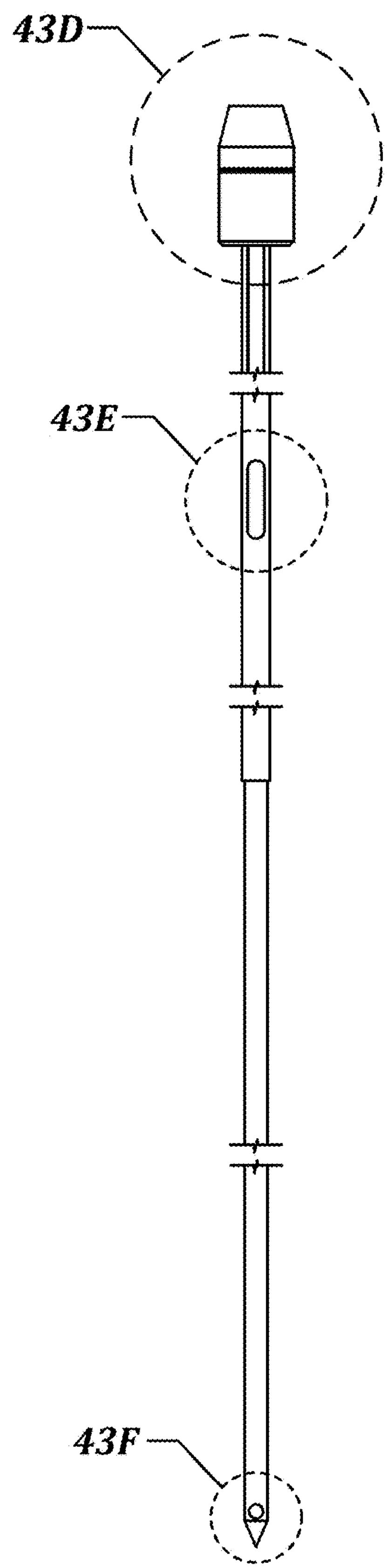
FIGS. 43A-43F show views of a side port type needle for use with injecting marinade into plant-based materials.
Figure 43B:
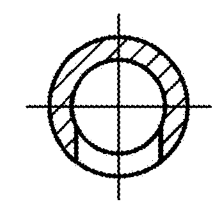
Figure 43D:
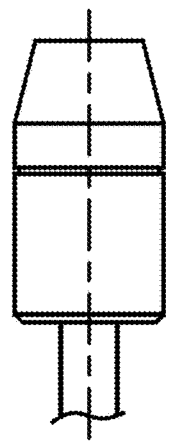
Figure 43E:
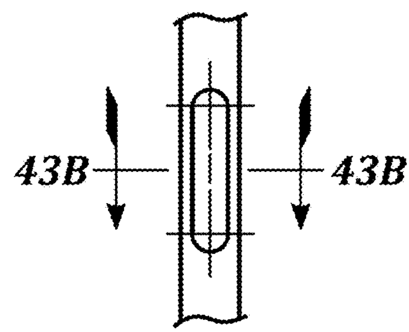
Figure 43C:
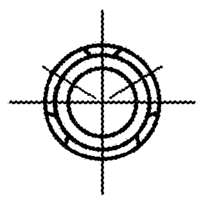
Figure 43F:
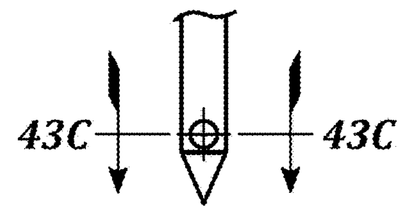

Not using phosphate will reduce the cost of the brine formulations and allow pork belly products to be labeled phosphate free or "all natural." (The "all natural" designation will require that the cure used is naturally occurring celery juice nitrite.) See FIGS. 17 and 18.

Example 3—Marinating Fresh Pork Loins without Salt

This example pertains to fresh pork that marinaded with a natural protein solution with no added salt. The United States Department of Agriculture (USDA) would allow this product to be labeled "pork and water".

Background

This example is to test the effect of functional protein brine on fresh marinated pork products. This example is also to determine if marinate retention in pork products of a marinade with salt could be improved upon by using a functional protein brine with no salt added to the brine.

Test Objective

To test the effect of functional protein brine and the effect of no salt functional protein brine on fresh pork loin ham and blade ends.

Test Plan

Treatments

- Functional Protein in an existing brine using 4 mm needles with hypodermic exit holes
- Functional Protein in a no salt brine using 4 mm with needles hypodermic exit holes Functional Protein Pork Injection Approximately 100 pounds of pork loins were split into ham end loins and blade end loins. See FIGS. 19, 22, 25, and 26. The ham end loins were portioned into 1.5 lbs. units and injected with brine to total approximately 1.7 lbs. with both (1) functional protein standard brine and (2) functional protein, no salt added brine. The blade end loins that were portioned to 1.3 lbs. units and injected with brine to total approximately 1.7 lbs. with both (1) functional protein standard brine and (2) functional protein no salt added brine. Following injection, the ham end loins and blade end loins were tumbled for 12 minutes and then vacuum packaged for later evaluation. See FIGS. 20, 21, 23, 24, and 27-29.

Brine Formulations

Natural Protein Standard Brine 13.5% Marinade

| Ingredients | % in Final | % in Marinade | Lbs in Marinade |
|---|---|---|---|
| Water | 2.50% | 19.00% | 38.00 |
| SC | 0.09% | 0.70% | 1.40 |
| NP | 10.00% | 76.17% | 152.35 |
| Verdad N6 | 0.31% | 2.37% | 4.74 |
| Salt | 0.23% | 1.76% | 3.51 |
| Total | | 100.00% | 200.00 |

Natural Protein No Salt Brine 13.5% Marinade

| Ingredients | % in Final | % in Marinade | Lbs in Marinade |
|---|---|---|---|
| Water | 2.50% | 19.01% | 38.02 |
| SC | 0.09% | 0.68% | 1.37 |
| NP | 10.25% | 77.95% | 155.89 |
| Verdad N6 | 0.31% | 2.36% | 4.71 |
| Total | | 100.00% | 200.00 |

Injector Settings

Injector Settings

| Test | Speed | Pressure | Injection | Advance | Stripper Holes |
|---|---|---|---|---|---|
| Ham Standard | 7 | 2.0 bar | 1 Way | Full | 2 holes |
| Blade Standard | 8 | 1.8 bar | 1 Way | Full | 2 holes |
| Ham No Salt | 6 | 2.1 bar | 1 Way | Full | 2 holes |
| Blade No Salt | 7 | 1.9 bar | 1 Way | Full | 1 hole |

Tumbler Settings

Tumbler Settings

| Time | Speed | Vacuum |
|---|---|---|
| 12 Minutes | 6 RPM | −25 in Hg |

Data Collection

Injection Data

| Natural Protein Standard Brine | | | | | Natural Protein No Salt Brine | | | | |
|---|---|---|---|---|---|---|---|---|---|
| Loin Number | End | Green Wt | Inject Wt | Injection % | Loin Number | End | Green Wt | Inject Wt | Injection % |
| 1 | Ham | 1.50 | 1.85 | 23.33% | 1 | Ham | 1.50 | 1.67 | 11.33% |
| 2 | Ham | 1.53 | 2.02 | 32.03% | 2 | Ham | 1.50 | 1.69 | 12.67% |
| 3 | Ham | 1.48 | 1.88 | 27.03% | 3 | Ham | 1.52 | 1.78 | 17.11% |
| 4 | Ham | 1.54 | 1.86 | 20.78% | 4 | Ham | 1.53 | 1.91 | 24.84% |
| 5 | Ham | 1.49 | 1.81 | 21.48% | 5 | Ham | 1.52 | 1.86 | 22.37% |

-continued

| Natural Protein Standard Brine | | | | | Natural Protein No Salt Brine | | | | |
|---|---|---|---|---|---|---|---|---|---|
| Loin Number | End | Green Wt | Inject Wt | Injection % | Loin Number | End | Green Wt | Inject Wt | Injection % |
| 6 | Ham | 1.53 | 1.81 | 18.30% | 6 | Ham | 1.52 | 1.82 | 19.74% |
| 7 | Ham | 1.51 | 1.85 | 22.52% | 7 | Ham | 1.52 | 1.79 | 17.76% |
| 8 | Ham | 1.49 | 1.77 | 18.79% | 8 | Ham | 1.51 | 1.82 | 20.53% |
| 9 | Ham | 1.53 | 1.84 | 20.26% | 9 | Ham | 1.48 | 1.75 | 18.24% |
| 10 | Ham | 1.51 | 1.92 | 27.15% | 10 | Ham | 1.53 | 1.74 | 13.73% |
| 1 | Blade | 1.33 | 1.82 | 36.84% | 1 | Blade | 1.34 | 1.80 | 34.33% |
| 2 | Blade | 1.35 | 1.74 | 28.89% | 2 | Blade | 1.35 | 1.75 | 29.63% |
| 3 | Blade | 1.36 | 1.66 | 22.06% | 3 | Blade | 1.31 | 1.79 | 36.64% |
| 4 | Blade | 1.32 | 1.77 | 34.09% | 4 | Blade | 1.33 | 1.71 | 28.57% |
| 5 | Blade | 1.32 | 1.75 | 32.58% | 5 | Blade | 1.36 | 1.82 | 33.82% |
| 6 | Blade | 1.34 | 1.73 | 29.10% | 6 | Blade | 1.35 | 1.78 | 31.85% |
| 7 | Blade | 1.34 | 1.71 | 27.61% | 7 | Blade | 1.36 | 1.73 | 27.21% |
| 8 | Blade | 1.35 | 1.85 | 37.04% | 8 | Blade | 1.35 | 1.87 | 38.52% |
| 9 | Blade | 1.32 | 1.75 | 32.58% | 9 | Blade | 1.33 | 1.76 | 32.33% |
| 10 | Blade | 1.35 | 1.87 | 38.52% | 10 | Blade | 1.34 | 1.85 | 38.06% |
| 11 | Blade | 1.31 | 1.74 | 32.82% | | | | | |

Package Data

| Package Weights | | |
|---|---|---|
| Treatment | End | Weight |
| Standard NP | Ham | 1.72 |
| Standard NP | Ham | 1.76 |
| Standard NP | Ham | 1.80 |
| Standard NP | Ham | 1.72 |
| Standard NP | Ham | 1.74 |
| Standard NP | Ham | 1.70 |
| Standard NP | Ham | 1.77 |
| Standard NP | Blade | 1.79 |
| Standard NP | Blade | 1.66 |
| Standard NP | Blade | 1.72 |
| Standard NP | Blade | 1.68 |
| Standard NP | Blade | 1.74 |
| Standard NP | Blade | 1.69 |
| Average Weight | | 1.73 |

| Package Weights | | |
|---|---|---|
| Treatment | End | Weight |
| No Salt | Ham | 1.70 |
| No Salt | Ham | 1.71 |
| No Salt | Ham | 1.75 |
| No Salt | Ham | 1.73 |
| No Salt | Ham | 1.81 |
| No Salt | Ham | 1.77 |
| No Salt | Blade | 1.72 |
| No Salt | Blade | 1.72 |
| No Salt | Blade | 1.71 |
| No Salt | Blade | 1.70 |
| Average Weight | | 1.73 |

Temperature Data

| Temperatures | | | |
|---|---|---|---|
| Test | Meat Temp | Brine Temp | Inject Temp |
| Ham Standard | 41° F. | 33° F. | 38° F. |
| Blade Standard | 41° F. | 33° F. | 37° F. |
| Ham No Salt | 40° F. | 34° F. | 36° F. |
| Blade No Salt | 41° F. | 34° F. | 37° F. |

Cook Results

After injection and tumbling, two of the standard natural protein injected ham end pork loins were cooked in a test kitchen oven. One loin was removed from the oven upon reaching a temperature of 160° F. and the other was purposely overcooked to 190° F. After the loins were cooled, both were evaluated for sensory attributes. The overcooked pork loin was actually preferred. In this regard, the juiciness was the same for both loins and the tenderness was increased in the overcooked product.

Next, a single no salt natural protein ham end pork loin was overcooked to the 190° F. range and was also found to be tender and juicy. However, the flavor was gauged to be slightly lower due to no added salt in the formula.

Conclusion

Both the standard natural protein brine and no added salt natural protein brine worked well. The retention of the brine after injection was very good. After tumbling, the product was dry with a very natural appearance. Additionally, the product looked good after vacuum packing with no purge in the package.

Example 4: Chicken Breast Strips Marinated without Salt

Background

This example investigated injecting marinate into chicken breasts with a no salt formulation, next tumbling the butterfly breast and then portioning the breasts into strips.

The process of marinating the chicken breasts prior to portioning and tumbling would seek to prevent the strips from being damaged and down-graded in the tumbling step. The proposed process was expected to result in a higher yield due to reduced instances of the strips being down-graded as well as a higher pick up from the marination injection. Also, marinating with a no salt formulation would prevent any trim material created during the portioning process to have any unwanted ingredients, such as salt or phosphate.

Treatment

A marinade was prepared using the natural protein solution and water formulation in the charts below. The mixture was emulsified prior to injection. Chicken butterfly breasts were injected to a target of 30% by weight. Following injection, the butterfly breasts were then tumbled for 10 minutes in a tabletop tumbler. The marinated butterfly breasts were then portioned into strips with a water jet portioner. See FIGS. 30-37.

Marinate Formulation

| | % in Brine | % in Final |
|---|---|---|
| Natural Protein | 65.00% | 15.00% |
| Water | 35.00% | 8.08% |

As discussed above in Example 1, the functional protein formulation consists primarily of ground up substrate emulsified in water. The amount of substrate can be from 15 to 25% and the amount of water can correspondingly be from 85 to 75%

Conclusion

The butterfly breasts after injection retained the marinade solution very well. After the tumbling, the butterfly breast were dry and had adsorbed all of the 30% marinade. The breast portioned well using a water jet portioner, with yield results very similar to that of a standard non-marinated breast. The marinated portioned chicken strips were then held in a cooler for 2 hours with no purge loss of the marinate noted.

The above process provides options for "low sodium" or "no added sodium" labeling of the chicken, which is not possible with the current standard process of portioning and then marinading the portions in a tumbler. Also, the above process would allow the chicken strips to go directly to a coating line after portioning.

The natural protein marinade can be prepared from the trim removed from the chicken breasts. In this regard, the amount of trim removed can be adjusted to match the amount of trim needed to produce the required quantity of marinade. In this regard, all of the chicken breast can be used, resulting in no or very little waste.

Example 5: Marinades for Sliced and Deli Turkey and Chicken

The following are examples of brine formulations for treating sliced and deli turkey and chicken:

17% injected Deli and Sliced Chicken

| Ingredients | % in final | % in marinade |
|---|---|---|
| Natural Protein | 13.00% | 89.50% |
| Chicken Broth | 0.50% | 3.45% |
| Water | 1.03% | 7.06% |
| Total | | 100.00% |

20% Injected Deli and Sliced Turkey

| Ingredients | % in final | % in marinade |
|---|---|---|
| Natural Protein | 15.00% | 90.00% |
| Broth | 0.50% | 3.00% |
| Water | 1.17% | 7.00% |
| Total | | 100% |

The above formulations do not include either sodium or potassium chloride. Flavoring for the deli and sliced turkey and chicken is obtained from the broth.

The amount of brine injected into the deli and sliced turkey and chicken is from about 10% by weight to about 65% by weight.

Example 6: Plant-Based Products

Plant-based products are being increasingly used as a substitute for animal protein. Marinades containing broth, vegetable oils and water are injected into the plant-based substrates to improve texture and flavor. The following is one example of a marinade formulation for plant-based chicken:

| Ingredient | % in Marinade | Weight (lbs) |
|---|---|---|
| Water | 43.75% | 175 |
| Sunflower Oil | 31.25% | 125 |
| Vegetable Chicken Type Flavor | 25.00% | 100 |
| TOTAL | 100.0% | 400 |

Of course many other formulations can be used, including formulations with different types of oils and flavoring ingredients. Further, the above components can be varied by at least 20% from the amounts set forth in the chart above.

One of the challenges of plant-based products is achieving an acceptable appearance, because plant-based products are currently extruded as low-profile sheets.

Also, the uniform dispersion of marinades within the product is a challenge. In this regard, 3 mm step-down hypodermic needles were chosen for injection of the marinade. The low profile of the plant-based material sheets suggested the use hypodermic needles to help ensure distribution of the marinade to the bottom of the sheets. See the needle drawings below. The use of step-down needles enabled penetration of the sheets with as small of a diameter needle as possible so as to not leave prominent needle holes in the sheets. The hypodermic needles by design are able to deliver the brine solution all the way to the bottom of the sheet.

On the other hand, side port exit needles provide a much better appearance than hypodermic needles in mimicking meat fibers, but only in the upper portion of the plant-based sheet. The reason for this is the exit holes of side port exit needles are positioned 6 to 7 mm above the tip of the needle. See the needle drawings in FIGS. 42A-42E and 43A-43F.

To address the limitations of hypodermic and side port needles, a combination manifold was employed, consisting of half of the needles being 3 mm step-down hypodermic needles, and the other half of the needles being 3 mm side port needles. This combination of needles provided the ability to inject all the way to the bottom of the plant-based material sheet while providing good sideways dispersion of the marinade to achieve a meat like appearance within the plant-based material.

Figures 38, 39:
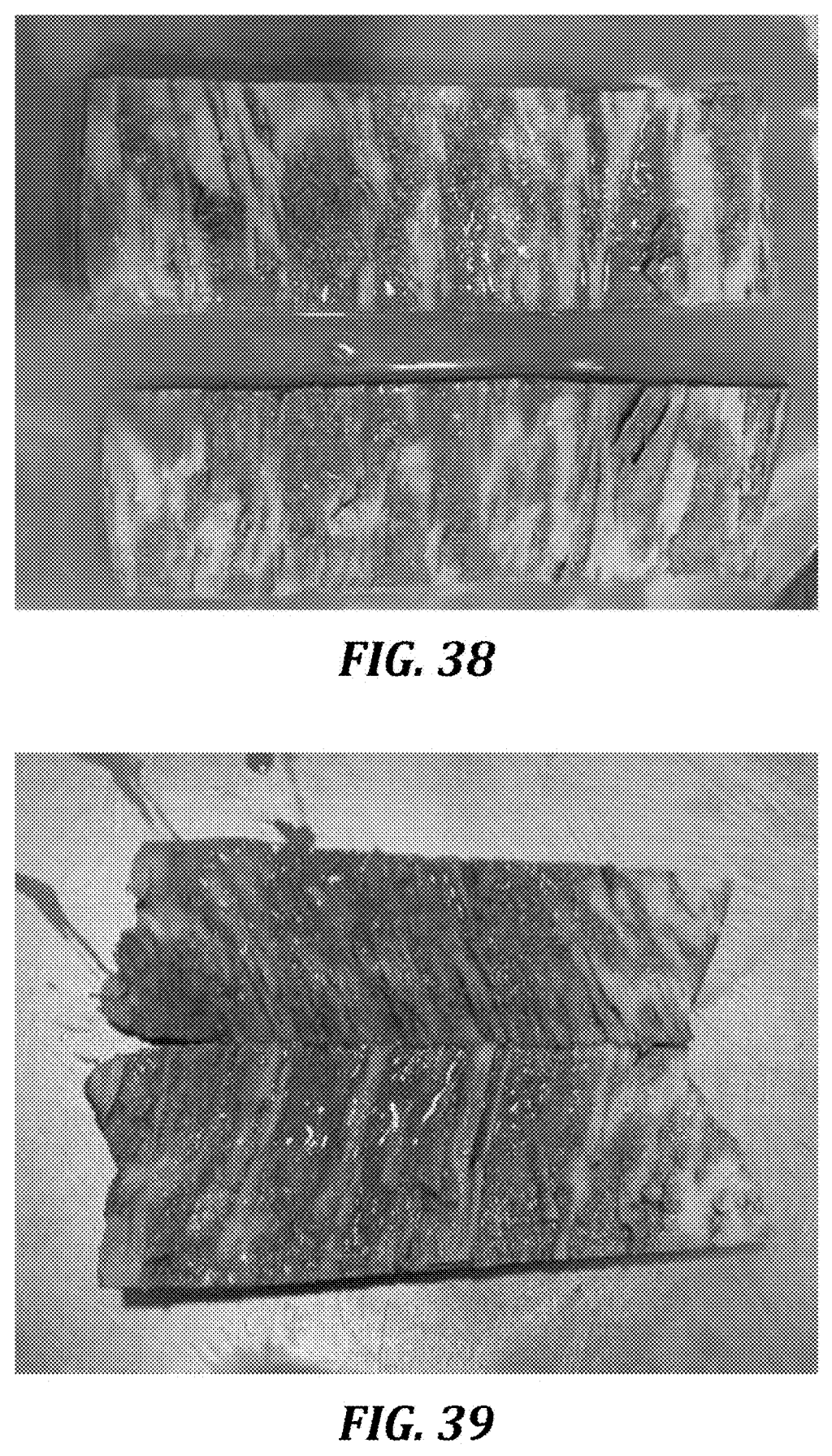

The photographs in FIGS. 38 and 39 show the results of a blue dye test using the combination needle manifold described above. The photographs show the dispersion of the blue dye within a sheet of plant-based material that has been cut open. As can be seen from the photographs, the combination of hypodermic and side port needles did an excellent job of distributing the brine into the plant-based sheets from top to bottom giving random textures found in typical meat substrates.

The marinated plant-based sheets can be cut into cutlets, tenders, nuggets, and popcorn to utilize as much as possible of the material so as to achieve a yield as high as possible. The remaining trim material can be used to produce the marinade for the plant-based material. As in the marinade for animal-based protein, the marinade for the plant-based material is emulsified and injected back into the sheets. See FIGS. 40 and 41.

This has at least two main advantages: 1) the trim material generally has a lower cost and injecting back into the main substrate increases the value of the trim material; and 2) the protein in the trim material thickens the marinade and improves the functionality of the marinade. This improved functionality will help with retention of the injected marinade, including during thermal processing of the plant-based material.

While illustrative embodiments have been illustrated and described, it will be appreciated that various changes can be made therein without departing from the spirit and scope of the invention.

The embodiments of the invention in which an exclusive property or privilege is claimed are defined as follows:

1. A phosphate-free brine for treating a food product by injection of the brine into the food product, the brine comprising:

water;

flavoring;

protein from a corresponding type of food product as the food product being injected with the brine;

wherein the brine includes no added salt and no phosphate; and wherein the protein is present in the brine in an amount of about 2 to 30 percent by weight.

2. The brine of claim 1, wherein the flavoring is selected from the group consisting of: broth, pickling spice, smoke flavor, and honey.

3. The brine of claim 2, wherein the broth is composed in part of the corresponding type of food product.

4. The brine of claim 1, wherein the food product is selected from the group consisting of deli meat, meat, poultry, fish, and plant material.

5. The brine of claim 4, wherein the deli meat is selected from the group consisting of deli beef, chicken, turkey, and pork.

6. The brine of claim 1, wherein the protein is a muscle protein composed of myofibrillar protein and sarcoplasmic protein.

7. The brine of claim 6, wherein the myofibrillar protein and the sarcoplasmic protein are present in the brine in a proportion that corresponds to the proportion present in the food product.

8. The brine of claim 1, further including a cure selected from the group consisting of nitrate, nitrite, and celery powder.

9. The brine of claim 8, further including a cure accelerator selected from the group consisting of cherry powder, sodium erythorbate, and sodium ascorbate.

10. The brine of claim 1, further comprising a binder selected from the group consisting of: starch, carrageenan, xanthan gum, soy protein.

11. The brine of claim 1, further comprising a sweetener selected from the group consisting of brown sugar, white sugar, honey, dextrose.

* * * * *